US011887428B2

(12) United States Patent
Warms et al.

(10) Patent No.: US 11,887,428 B2
(45) Date of Patent: Jan. 30, 2024

(54) GAME OF CHANCE WITH SHORT- AND LONG-TERM PERSISTENCE FEATURES

(71) Applicant: Aristocrat Technologies, Inc., Las Vegas, NV (US)

(72) Inventors: Nathan Warms, Austin, TX (US); Jennifer Mizzi, Round Rock, TX (US); Rogelio Decasa, Jr., Renton, WA (US); Zachary Smith, Austin, TX (US); Erick Ching, Cedar Park, TX (US); Jeffrey Uss, Liberty Hill, TX (US); Hanna Sanborn, Georgetown, TX (US)

(73) Assignee: Aristocrat Technologies, Inc., Las Vegas, NV (US)

( * ) Notice: Subject to any disclaimer, the term of this patent is extended or adjusted under 35 U.S.C. 154(b) by 121 days.

(21) Appl. No.: 17/456,724

(22) Filed: Nov. 29, 2021

(65) Prior Publication Data

US 2023/0169820 A1 Jun. 1, 2023

(51) Int. Cl.
*G07F 17/32* (2006.01)

(52) U.S. Cl.
CPC ...... *G07F 17/3213* (2013.01); *G07F 17/3262* (2013.01)

(58) Field of Classification Search
CPC .......................... G07F 17/3213; G07F 17/3262
See application file for complete search history.

(56) References Cited

U.S. PATENT DOCUMENTS

2003/0064772 A1* 4/2003 Tempest .................. G07F 17/32 463/16
2015/0339882 A1 11/2015 Shiraishi
2016/0358412 A1* 12/2016 Eaton .................. G07F 17/3267
2018/0268659 A1* 9/2018 Chesworth .......... G07F 17/3213
2019/0096168 A1 3/2019 Salmon (Continued)

OTHER PUBLICATIONS

"Prize Pool Fierce Dragon™ & Cactus Cash™ by Incredible Technologies" by Incredible Technologies. YouTube—Broadcast Yourself. [dated Jul. 22, 2020], [online], retrieved on [May 23, 2023]. <URL:https://www.youtube.com/watch?v=iTue57xTw4g>.2 Pages (Year: 2020).*

(Continued)

*Primary Examiner* — Milap Shah

(74) *Attorney, Agent, or Firm* — Weaver Austin Villeneuve & Sampson LLP

(57) ABSTRACT

Techniques and systems for providing games of chance with multiple levels of persistent features are disclosed. Some example systems include scatter prize indicators that are each associated with different symbol positions of a game of chance. When a scatter symbol is selected for a given symbol position, the scatter prize indicator associated therewith may be upgraded; selection of a sufficient number of symbol positions may result in a feature game mode being activated. During feature game mode play, scatter symbols are retained after each play of the game until either sufficient consecutive plays occur without any scatter symbols being obtained or until all symbol positions have scatter symbols. In the latter case, the scatter prize indicators are upgraded and play continues. In the former case, the feature game mode concludes. Various enhancements may be triggered based on the number of times that the feature game mode has been activated.

19 Claims, 26 Drawing Sheets

(56) References Cited

U.S. PATENT DOCUMENTS

| | | | | |
|---|---|---|---|---|
| 2020/0074814 | A1 | 3/2020 | Marks | |
| 2020/0090457 | A1* | 3/2020 | Wright | G07F 17/3209 |
| 2020/0152001 | A1* | 5/2020 | Salmon | G07F 17/34 |
| 2021/0256812 | A1* | 8/2021 | Kearns | G07F 17/3213 |
| 2022/0262206 | A1* | 8/2022 | Djemal | G07F 17/3213 |

OTHER PUBLICATIONS

"Prize Pool Cactus Cash"—itsgames.com. [dated Mar. 9, 2020], [online], [retrieved on May 23, 2023]. <URL:https://web.archive.org/web/20200309233143/https://gaming.itsgames.com/games/prize-pool-cactus-cash>. 3 Pages. (Year: 2020).*

"New—Prize Pool Cactus Cash Slot Machine Nice Spin Advantage Play"—YouTube Video posted Jul. 13, 2021, description states Played at / Slot Brand: Barona Calif. / Incredible Technologies When: Apr. 2021.

* cited by examiner

| Value | Indicator | Tier | Value | Indicator | Tier |
|---|---|---|---|---|---|
| 0.5x | 0.5x | 1 | 4x | 4x | 8 |
| 1x | 1x | 2 | 4.5x | 4.5x | 9 |
| 1.5x | 1.5x | 3 | 5x | Mini | 10 |
| 2x | 2x | 4 | 10x | Minor | 11 |
| 2.5x | 2.5x | 5 | 20x | Maxi | 12 |
| 3x | 3x | 6 | 40x | Major | 13 |
| 3.5x | 3.5x | 7 | 500x | Grand | 14 |

GAME OF CHANCE WITH SHORT- AND LONG-TERM PERSISTENCE FEATURES

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In some cases, a player may qualify for a special mode of the base game, a secondary game, or a bonus round of the base game by attaining a certain winning combination or triggering event in, or related to, the base game, or after the player is randomly awarded the special mode, secondary game, or bonus round. In the special mode, secondary game, or bonus round, the player is given an opportunity to win extra game credits, game tokens or other forms of payout. In the case of "game credits" that are awarded during play, the game credits are typically added to a credit meter total on the EGM and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player over the course of many plays or instances of the game, which is generally referred to as return to player (RTP). The RTP and randomness of the RNG ensure the fairness of the games and are highly regulated. Upon initiation of play, the RNG randomly determines a game outcome and symbols are then selected which correspond to that outcome. Notably, some games may include an element of skill on the part of the player and are therefore not entirely random.

SUMMARY

Discussed herein are various techniques for providing games of chance that include a feature game mode that incorporates multiple potential levels of persistence. For example, such games may include a set of symbol positions, e.g., reel windows that each display a single symbol from a reel spin, that are each associated with a corresponding scatter prize indicator. The scatter prize indicators may each, in turn, be associated with one of multiple tiers of scatter prize indicators, each of which may have a corresponding award amount or award effect (such as a multiplier effect).

During play of the game of chance while the feature game mode is inactive, plays of the game of chance that result in one or more symbols of a particular type, e.g., scatter symbols, may result in the scatter prize indicator(s) associated with the symbol position(s) in which such a symbol or symbols are displayed to be "upgraded" to the next higher tier of scatter prize indicator, assuming that the scatter prize indicator in question meets a scatter prize indicator upgrade condition (for example, such a condition may be that the scatter prize indicator in question is not already of the highest tier of scatter prize indicator). In some implementations, an award may also be provided to the player prior to the upgrade of the scatter prize indicator; such an award may be based on the pre-upgrade scatter prize indicator in question. The scatter prize indicators (and the upgrades thereof) that are associated with the symbol positions are retained from play to play of the game of chance, which provides a persistence feature that allows players to, over time, upgrade the scatter prize indicators that are associated with the symbol positions—this has the effect of increasing, over time, the potential winnings that the player may receive based on the scatter prize indicators.

Plays of the game of chance that result in one or more scatter symbols being displayed in the symbol positions may also potentially cause the feature game mode to be activated. For example, for each play of the game of chance, a determination may be made as to how many scatter symbols are selected for display in the symbol positions; if the number of scatter symbols that are selected for display equals or exceeds a threshold amount, e.g., six, then this may cause the game of chance to transition to the feature game mode. In the feature game mode, the game of chance operates somewhat differently from how it operated when the feature game mode was inactive. To begin with, symbol positions that are associated with scatter symbols, e.g., as a result of a play of the game of chance, are retained and not replaced with newly selected symbols during subsequent plays of the game of chance while the feature game mode is active—at least for the current round of feature game play. Additionally, the player may be provided with a limited number of game plays of the game of chance while the feature game mode is active, e.g., three plays. Each time the player plays the game of chance while the feature game mode is active and no additional scatter symbols are associated with the symbol positions, the number of game plays may be adjusted upward or downward (depending on how the game of chance tracks how many plays are remaining) to reflect the play of the game of chance. If such a play of the game of chance while the feature game mode is active results in the association of one or more additional scatter symbols with the symbol positions, then the number of game plays of the game of chance that are available to the player may be reset, e.g., to three.

Once the available game plays of the game of chance have been used up, the feature game mode may conclude, in which case the player may be provided with an award that is based on the scatter prize indicators that are associated with the symbol positions (if any) that are associated with scatter symbols at the time the feature game mode concludes. The feature prize indicators may then be reset, e.g., randomly selected, and subsequent play of the game of chance may proceed with the feature game mode being inactive (at least until the feature game mode is potentially re-activated, e.g., by a play of the game of chance resulting in the display of a number of scatter symbols that exceeds the threshold amount that causes the feature game mode to be activated.

If it is the case that all of the symbol positions are associated with scatter symbols as the result of a play of the game of chance while the feature game mode is active, then several actions may be taken. First, the player may be provided with an award that is based on all of the scatter prize indicators that are associated with the symbol positions. Second, the scatter prize indicators that meet the scatter prize indicator upgrade condition may be upgraded. Third, the current round of the feature game mode may conclude and a new round of the feature game mode may be initiated; in conjunction with the new round of the feature game mode being initiated, the associations of the symbol positions with the scatter symbols may be cleared or reset, e.g., such that the next play of the game of chance while the feature game mode is active will cause symbols to be selected for all of the symbol positions.

It will be apparent that during game play while the feature game mode is active, there is a potential for game play to continue indefinitely—as long as at least one scatter symbol continues to be selected before the number of additional game plays available reaches zero, the feature game mode will continue to be active, and the scatter prize indicators that are displayed will inexorably continue to be upgraded until they reach the highest scatter prize indicator tier. In practice, the chances of a scatter symbol being selected for a given game play and symbol indicator may be managed such that this eventuality is statistically impossible—were such a scenario to occur, the player would eventually simply continue to win the maximum award possible, which would be undesirable (or, if the award has actual monetary value, be fiscally catastrophic for the entity providing the game of chance).

One mechanism that such games of chance may utilize to manage this risk is to have the game of chance use a selective RTP mechanism during the feature game mode. In such games of chance, the selection of symbols during game play while the feature game mode is inactive may, for example, proceed using typical symbol selection mechanisms for slot-type games, e.g., treating each subset of symbol positions in each vertical column of symbol positions as if those symbol positions were physical windows in a slot machine that aligned with a single reel of the slot machine and then selecting a sequence of symbols from a virtual reel strip to show in those symbol positions. The virtual reel strip for those symbol positions may be thought of as a first symbol set of a plurality of first symbol sets (at least one for each "reel") or a first reel set of symbols.

However, the selection of symbols during game play while the feature game mode is active may proceed differently. In such games of chance, symbol selection for each symbol position may be done independently of the symbol selection for the other symbol positions while the feature game mode is active. Moreover, the symbol sets from which such symbol selections are made, which may also be thought of as one of multiple second symbol sets or a second reel set of symbols, may be selected for each symbol position based at least on the tier of the scatter prize indicator that is associated with that symbol position (in some instances, the first/second symbol sets may be reversed, depending on which is discussed first in a particular discussion). This allows, for example, the symbol for a symbol position associated with a tier-one scatter prize indicator to be selected from a symbol set for tier-one scatter prize indicators, while a symbol for a symbol position associated with a tier-four scatter prize indicator would be selected from a symbol set for tier-four scatter prize indicators. The two symbol sets may be configured differently, e.g., so that there is a higher chance of selecting a scatter symbol when using the tier-one symbol set as opposed to the tier-four symbol set. Thus, the chances of selecting a scatter symbol may be controlled on a tier-by-tier basis for the symbol positions based on their associations with their respective scatter prize indicators. Moreover, in some implementations, there may be additional factors that such a game of chance may take into account when selecting a symbol set for a given tier for use in making a symbol selection. For example, a tier of scatter prize indicators may be associated with multiple symbol sets, each of which may be associated with, for example, a particular parameter such as the total number of symbol positions that are not yet associated with scatter symbols in the current round of the feature game mode. This allows for the probability of a scatter symbol being selected to not only be tuned based on the tier of the scatter prize indicator associated with the symbol position for which the symbol is being selected, but also based on how close the player is to having all of the symbol positions associated with scatter symbols. Another potential parameter for which different symbol sets may be provided is the number of rounds that have occurred for a given instance of feature game mode play. Such tier-based symbol set selection allows for the probabilities of achieving scatter symbol selections to be managed with granularity that allows the overall experience of the feature game mode to be controlled so as to prevent the possibility of excessive rounds (and payouts) occurring while still providing a satisfying play experience for players.

Various implementations will become apparent from the discussion below and the examples provided; the above description is not intended to be limiting, and other implementations will be apparent from the discussion herein that are also considered to be within the scope of this disclosure.

BRIEF DESCRIPTION OF THE DRAWINGS

FIGS. 21-1 through 21-3 depict a flow diagram of an example technique for providing a game of chance with a feature game mode as discussed herein.

Figure 1:
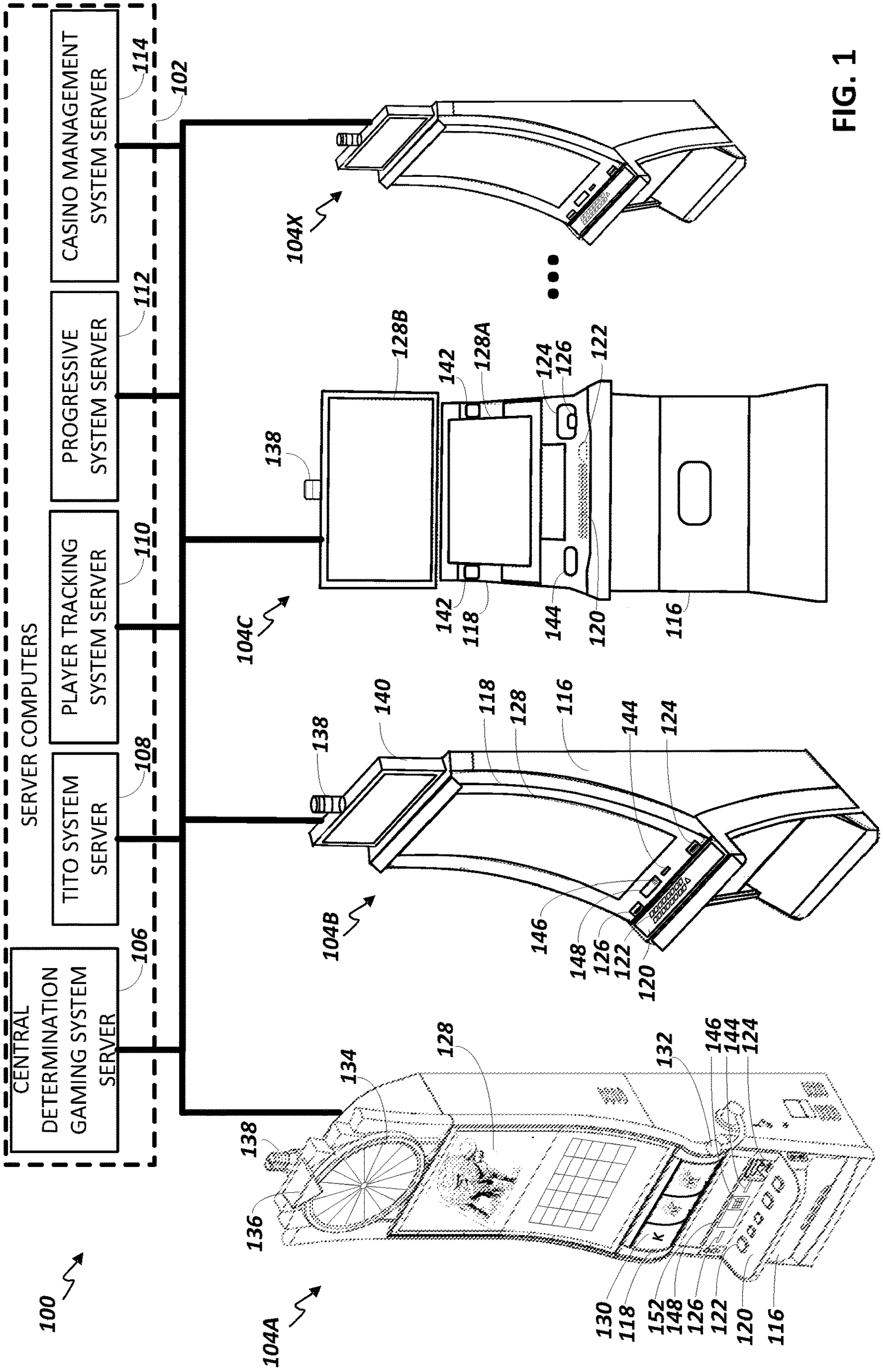
FIG. 1 is an exemplary diagram showing several EGMs networked with various gaming related servers.

The Figures are provided for the purpose of providing examples and clarity regarding various aspects of this disclosure, and are not intended to be limiting.

DETAILED DESCRIPTION

As discussed above, the present disclosure is directed at games of chance in which a persistent set of scatter prize indicators is provided; the scatter prizes are selected from a plurality of different scatter prize indicator tiers. Each scatter prize indicator is associated with a different symbol position in a plurality of symbol positions. During play of the game of chance while a feature game mode is not active, symbol selections are made for each of the symbol positions. If the symbol selected for a given symbol position is of a first type of symbol, e.g., a scatter symbol, then the player may be provided with an award that is based on the scatter prize indicator and the scatter prize indicator, if it meets a scatter prize indicator upgrade condition, may be upgraded to a higher tier of scatter prize indicator. If enough symbols of the first type of symbol are selected for the symbol positions in a given play of the game of chance, then the feature game mode may be activated.

While the feature game mode is activated, the player may be provided with an opportunity to play the game of chance in feature game mode for one or more rounds of play. During each round of play, symbol selections may occur responsive to each play of the game of chance and for each symbol position that is not already associated with a symbol of the first type of symbol in that round of play. The feature game mode may continue until a predetermined number of consecutive game plays results in no additional symbol positions having symbols of the first type selected therefor, at which point that instance of feature game mode play may conclude. The player may then be provided with an award based on the scatter prize indicators associated with the symbol positions that are associated with symbols of the first type of symbol and the scatter prize indicators then reset. An instance of the feature game mode, it will be understood, refers to feature game mode session that begins when the feature game mode is triggered and ends when the feature game mode concludes. If the feature game mode is subsequently triggered again, then a new instance of the feature game mode may be initiated.

Each time that a symbol selection occurs while the feature game mode is active that results in all of the symbol positions having been associated with symbols of the first type of symbol during the current round, the player may be provided with an award that is based on the scatter prize indicators for all of the symbol positions, the scatter prize indicators may (if meeting the scatter prize indicator upgrade condition) be upgraded, and the current round may be concluded and a new round started.

As discussed above and in more detail below, games of chance having such mechanics may result in an undesirably high chance of "runaway" play, e.g., where the feature game mode may, in theory, never stop. This results, of course, in potentially infinite winnings and is undesirable. While the potential for such an occurrence may be reduced or eliminated through the use of reel sets with low enough probabilities of having symbols of the first type of symbol be selected, such reel sets may also have the effect of causing the feature game mode to end too quickly—e.g., quickly enough that players feel cheated of the opportunity to reap the awards of the feature game mode. Also discussed herein is a symbol selection technique for use during the feature game mode that allows for a much more flexible approach to determining outcomes for such games of chance during feature game mode.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console. Gaming devices 104A-104X utilize specialized software and/or hardware to form non-generic, particular machines or apparatuses that comply with regulatory requirements regarding devices used for wagering or games of chance that provide monetary awards.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communication networks, such as over the Internet through a website maintained by a computer on a remote server or over an online data network including commercial online service providers, Internet service providers, private networks (e.g., local area networks and enterprise networks), and the like (e.g., wide area networks). The communication networks could allow gaming devices 104A-104X to communicate with one another and/or the server computers 102 using a variety of communication-based technologies, such as radio frequency (RF) (e.g., wireless fidelity (WiFi®) and Bluetooth®), cable TV, satellite links and the like.

In some implementation, server computers 102 may not be necessary and/or preferred. For example, in one or more implementations, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The mechanical reels 130 are independently spun and stopped to show a set of symbols within the gaming display area 118 which may be used to determine an outcome to the game.

In many configurations, the gaming device 104A may have a main display 128 (e.g., video display monitor) mounted to, or above, the gaming display area 118. The main display 128 can be a high-resolution liquid crystal display (LCD), plasma, light emitting diode (LED), or organic light emitting diode (OLED) panel which may be flat or curved as shown, a cathode ray tube, or other conventional electronically controlled video monitor.

In some implementations, the bill validator 124 may also function as a "ticket-in" reader that allows the player to use a casino issued credit ticket to load credits onto the gaming device 104A (e.g., in a cashless ticket ("TITO") system). In such cashless implementations, the gaming device 104A may also include a "ticket-out" printer 126 for outputting a credit ticket when a "cash out" button is pressed. Cashless TITO systems are used to generate and track unique barcodes or other indicators printed on tickets to allow players to avoid the use of bills and coins by loading credits using a ticket reader and cashing out credits using a ticket-out printer 126 on the gaming device 104A. The gaming device 104A can have hardware meters for purposes including ensuring regulatory compliance and monitoring the player credit balance. In addition, there can be additional meters that record the total amount of money wagered on the gaming device, total amount of money deposited, total amount of money withdrawn, total amount of winnings on gaming device 104A.

In some implementations, a player tracking card reader 144, a transceiver for wireless communication with a mobile device (e.g., a player's smartphone), a keypad 146, and/or an illuminated display 148 for reading, receiving, entering, and/or displaying player tracking information is provided in gaming device 104A. In such implementations, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some implementations, the information panel(s) 152 may be implemented as an additional video display.

Gaming devices 104A have traditionally also included a handle 132 typically mounted to the side of main cabinet 116 which may be used to initiate game play.

Figure 2A:
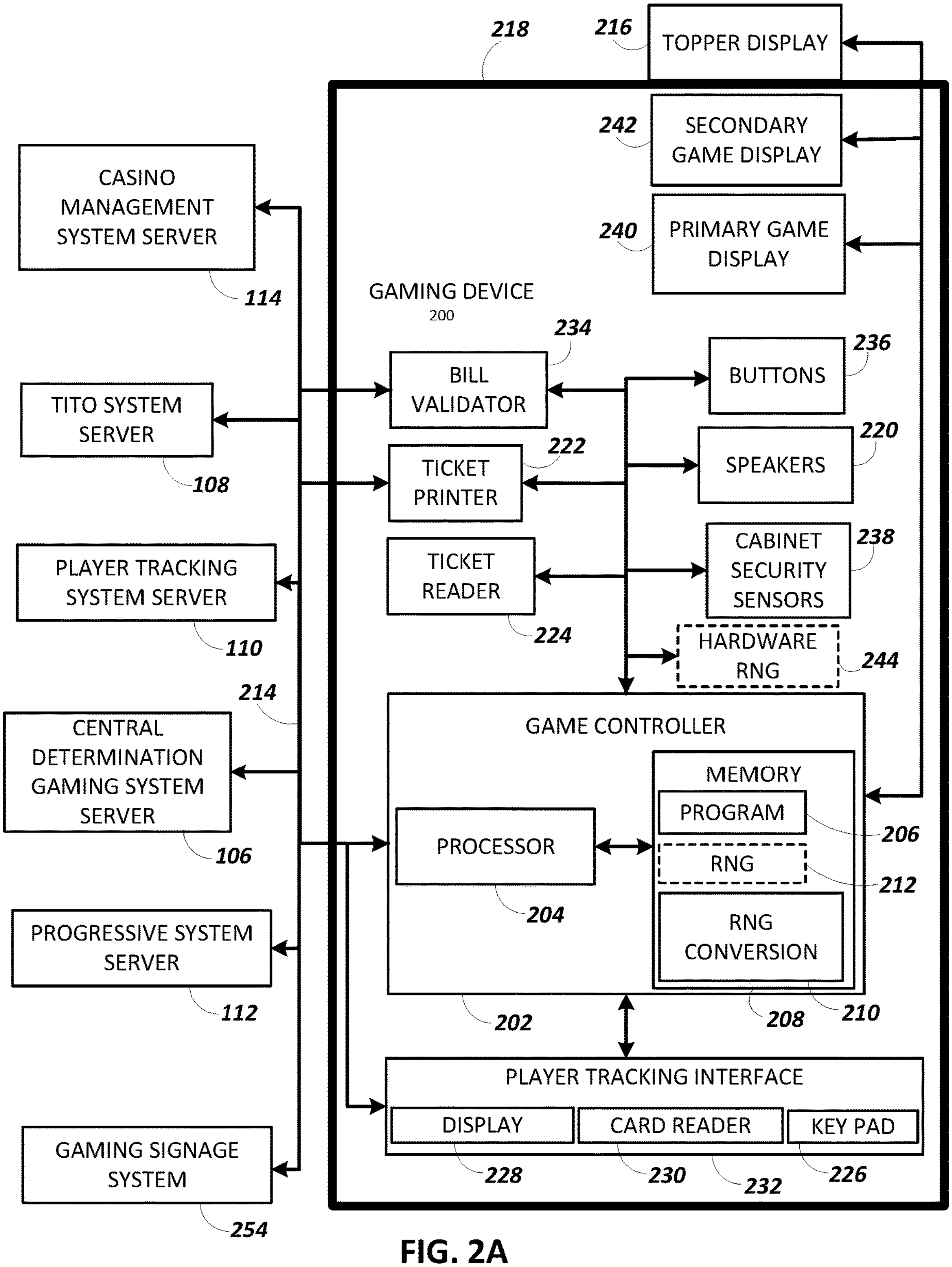
FIG. 2A is a block diagram showing various functional elements of an exemplary EGM.

Many or all the above described components can be controlled by circuitry (e.g., a game controller) housed inside the main cabinet 116 of the gaming device 104A, the details of which are shown in FIG. 2A.

An alternative example gaming device 104B illustrated in FIG. 1 is the Arc™ model gaming device manufactured by Aristocrat® Technologies, Inc. Note that where possible, reference numerals identifying similar features of the gaming device 104A implementation are also identified in the gaming device 104B implementation using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some implementations, the optional topper screen 140 may also or alternatively be used to display progressive jackpot prizes available to a player during play of gaming device 104B.

Example gaming device 104B includes a main cabinet 116 including a main door which opens to provide access to the interior of the gaming device 104B. The main or service door is typically used by service personnel to refill the ticket-out printer 126 and collect bills and tickets inserted into the bill validator 124. The main or service door may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the main display 128A may have a curvature radius from top to bottom, or alternatively from side to side. In some implementations, main display 128A is a flat panel display. Main display 128A is typically used for primary game play while secondary display 128B is typically used for bonus game play, to show game features or attraction activities while the game is not in play or any other information or media desired by the game designer or operator. In some implementations, example gaming device 104C may also include speakers 142 to output various audio such as game sound, background music, etc.

Many different types of games, including mechanical slot games, video slot games, video poker, video blackjack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2A is a block diagram depicting exemplary internal electronic components of a gaming device 200 connected to various external systems. All or parts of the gaming device 200 shown could be used to implement any one of the example gaming devices 104A-X depicted in FIG. 1. As shown in FIG. 2A, gaming device 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. FIG. 2 also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2A illustrates that game controller 202 includes a single processor 204, game controller 202 is not limited to this representation and instead can include multiple processors 204 (e.g., two or more processors).

FIG. 2A illustrates that processor 204 is operatively coupled to memory 208. Memory 208 is defined herein as including volatile and nonvolatile memory and other types of non-transitory data storage components. Volatile memory is memory that do not retain data values upon loss of power. Nonvolatile memory is memory that do retain data upon a loss of power. Examples of memory 208 include random access memory (RAM), read-only memory (ROM), hard disk drives, solid-state drives, universal serial bus (USB) flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2A illustrates that game controller 202 includes a single memory 208, game controller 202 could include multiple memories 208 for storing program instructions and/or data.

Memory 208 can store one or more game programs 206 that provide program instructions and/or data for carrying out various implementations (e.g., game mechanics) described herein. Stated another way, game program 206 represents an executable program stored in any portion or component of memory 208. In one or more implementations, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be set up to generate one or more game instances based on instructions and/or data that gaming device 200 exchanges with one or more remote gaming devices, such as a central determination gaming system server 106 (not shown in FIG. 2A but shown in FIG. 1). For purpose of this disclosure, the term "game instance" refers to a play or a round of a game that gaming device 200 presents (e.g., via a user interface (UI)) to a player. The game instance is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from memory 208 (e.g., from a read only memory (ROM)) or from the central determination gaming system server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2A illustrates that gaming device 200 could include an RNG 212 that utilizes hardware and/or software to generate RNG outcomes that lack any pattern. The RNG operations are often specialized and non-generic in order to comply with regulatory and gaming requirements. For example, in a slot game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating Bingo cards. In one or more implementations, RNG 212 could be one of a set of RNGs operating on gaming device 200. More generally, an output of the RNG 212 can be the basis on which game outcomes are determined by the game controller 202. Game developers could vary the degree of true randomness for each RNG (e.g., pseudorandom) and utilize specific RNGs depending on game requirements. The output of the RNG 212 can include a random number or pseudorandom number (either is generally referred to as a "random number").

In FIG. 2A, RNG 212 and hardware RNG 244 are shown in dashed lines to illustrate that RNG 212, hardware RNG 244, or both can be included in gaming device 200. In one implementation, instead of including RNG 212, gaming device 200 could include a hardware RNG 244 that generates RNG outcomes. Analogous to RNG 212, hardware RNG 244 performs specialized and non-generic operations in order to comply with regulatory and gaming requirements. For example, because of regulation requirements, hardware RNG 244 could be a random number generator that securely produces random numbers for cryptography use. The gaming device 200 then uses the secure random numbers to generate game outcomes for one or more game features. In another implementation, the gaming device 200 could include both hardware RNG 244 and RNG 212. RNG 212 may utilize the RNG outcomes from hardware RNG 244 as one of many sources of entropy for generating secure random numbers for the game features.

Another regulatory requirement for running games on gaming device 200 includes ensuring a certain level of RTP. Similar to the randomness requirement discussed above, numerous gaming jurisdictions also mandate that gaming device 200 provides a minimum level of RTP (e.g., RTP of at least 75%). A game can use one or more lookup tables (also called weighted tables) as part of a technical solution that satisfies regulatory requirements for randomness and RTP. In particular, a lookup table can integrate game features (e.g., trigger events for special modes or bonus games; newly introduced game elements such as extra reels, new symbols, or new cards; stop positions for dynamic game elements such as spinning reels, spinning wheels, or shifting reels; or card selections from a deck) with random numbers generated by one or more RNGs, so as to achieve a given level of volatility for a target level of RTP. (In general, volatility refers to the frequency or probability of an event such as a special mode, payout, etc. For example, for a target level of RTP, a higher-volatility game may have a lower payout most of the time with an occasional bonus having a very high payout, while a lower-volatility game has a steadier payout with more frequent bonuses of smaller amounts.) Configuring a lookup table can involve engineering decisions with respect to how RNG outcomes are mapped to game outcomes for a given game feature, while still satisfying regulatory requirements for RTP. Configuring a lookup table can also involve engineering decisions about whether different game features are combined in a given entry of the lookup table or split between different entries (for the respective game features), while still satisfying regulatory requirements for RTP and allowing for varying levels of game volatility.

FIG. 2A illustrates that gaming device 200 includes an RNG conversion engine 210 that translates the RNG outcome from RNG 212 to a game outcome presented to a player. To meet a designated RTP, a game developer can set up the RNG conversion engine 210 to utilize one or more lookup tables to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

FIG. 2A also depicts that gaming device 200 is connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 to establish a credit balance on the gaming device. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views with one or more UIs, the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Additionally, or alternatively, gaming devices 104A-104X and 200 can include or be coupled to one or more wireless transmitters, receivers, and/or transceivers (not shown in FIGS. 1 and 2A) that communicate (e.g., Bluetooth® or other near-field communication technology) with one or more mobile devices to perform a variety of wireless operations in a casino environment. Examples of wireless operations in a casino environment include detecting the presence of mobile devices, performing credit, points, comps, or other marketing or hard currency transfers, establishing wagering sessions, and/or providing a personalized casino-based experience using a mobile application. In one implementation, to perform these wireless operations, a wireless transmitter or transceiver initiates a secure wireless connection between a gaming device 104A-104X and 200 and a mobile device. After establishing a secure wireless connection between the gaming device 104A-104X and 200 and the mobile device, the wireless transmitter or transceiver does not send and/or receive application data to and/or from the mobile device. Rather, the mobile device communicates with gaming devices 104A-104X and 200 using another wireless connection (e.g., WiFi® or cellular network). In another implementation, a wireless transceiver establishes a secure connection to directly communicate with the mobile device. The mobile device and gaming device 104A-104X and 200 sends and receives data utilizing the wireless transceiver instead of utilizing an external network. For example, the mobile device would perform digital wallet transactions by directly communicating with the wireless transceiver. In one or more implementations, a wireless transmitter could broadcast data received by one or more mobile devices without establishing a pairing connection with the mobile devices.

Although FIGS. 1 and 2A illustrate specific implementations of a gaming device (e.g., gaming devices 104A-104X and 200), the disclosure is not limited to those implementations shown in FIGS. 1 and 2. For example, not all gaming devices suitable for implementing implementations of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or tabletops and have displays that face upwards. Gaming devices 104A-104X and 200 may also include other processors that are not separately shown. Using FIG. 2A as an example, gaming device 200 could include display controllers (not shown in FIG. 2A) configured to receive video input signals or instructions to display images on game displays 240 and 242. Alternatively, such display controllers may be integrated into the game controller 202. The use and discussion of FIGS. 1 and 2 are examples to facilitate ease of description and explanation.

Figure 2B:
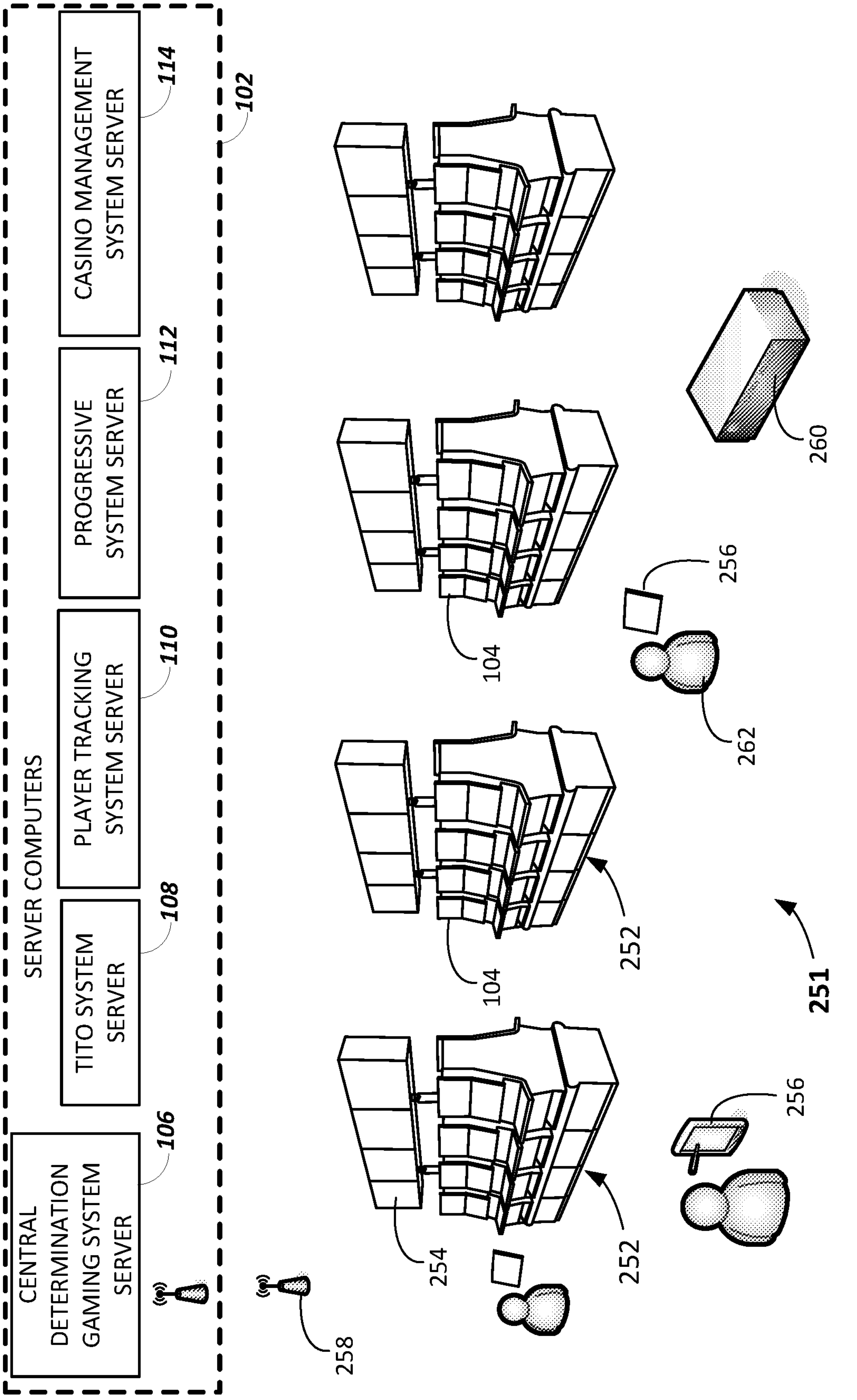
FIG. 2B depicts a casino gaming environment according to one example.

FIG. 2B depicts a casino gaming environment according to one example. In this example, the casino 251 includes banks 252 of EGMs 104. In this example, each bank 252 of EGMs 104 includes a corresponding gaming signage system 254 (also shown in FIG. 2A). According to this implementation, the casino 251 also includes mobile gaming devices 256, which are also configured to present wagering games in this example. The mobile gaming devices 256 may, for example, include tablet devices, cellular phones, smart phones and/or other handheld devices. In this example, the mobile gaming devices 256 are configured for communication with one or more other devices in the casino 251, including but not limited to one or more of the server computers 102, via wireless access points 258.

According to some examples, the mobile gaming devices 256 may be configured for stand-alone determination of game outcomes. However, in some alternative implementations the mobile gaming devices 256 may be configured to receive game outcomes from another device, such as the central determination gaming system server 106, one of the EGMs 104, etc.

Some mobile gaming devices 256 may be configured to accept monetary credits from a credit or debit card, via a wireless interface (e.g., via a wireless payment app), via tickets, via a patron casino account, etc. However, some mobile gaming devices 256 may not be configured to accept monetary credits via a credit or debit card. Some mobile gaming devices 256 may include a ticket reader and/or a ticket printer whereas some mobile gaming devices 256 may not, depending on the particular implementation.

In some implementations, the casino 251 may include one or more kiosks 260 that are configured to facilitate monetary transactions involving the mobile gaming devices 256, which may include cash out and/or cash in transactions. The kiosks 260 may be configured for wired and/or wireless communication with the mobile gaming devices 256. The kiosks 260 may be configured to accept monetary credits from casino patrons 262 and/or to dispense monetary credits to casino patrons 262 via cash, a credit or debit card, via a wireless interface (e.g., via a wireless payment app), via tickets, etc. According to some examples, the kiosks 260 may be configured to accept monetary credits from a casino patron and to provide a corresponding amount of monetary credits to a mobile gaming device 256 for wagering purposes, e.g., via a wireless link such as a near-field communications link. In some such examples, when a casino patron 262 is ready to cash out, the casino patron 262 may select a cash out option provided by a mobile gaming device 256, which may include a real button or a virtual button (e.g., a button provided via a graphical user interface) in some instances. In some such examples, the mobile gaming device 256 may send a "cash out" signal to a kiosk 260 via a wireless link in response to receiving a "cash out" indication from a casino patron. The kiosk 260 may provide monetary credits to the casino patron 262 corresponding to the "cash out" signal, which may be in the form of cash, a credit ticket, a credit transmitted to a financial account corresponding to the casino patron, etc.

In some implementations, a cash-in process and/or a cash-out process may be facilitated by the TITO system server 108. For example, the TITO system server 108 may control, or at least authorize, ticket-in and ticket-out transactions that involve a mobile gaming device 256 and/or a kiosk 260.

Some mobile gaming devices 256 may be configured for receiving and/or transmitting player loyalty information. For example, some mobile gaming devices 256 may be configured for wireless communication with the player tracking system server 110. Some mobile gaming devices 256 may be configured for receiving and/or transmitting player loyalty information via wireless communication with a patron's player loyalty card, a patron's smartphone, etc.

According to some implementations, a mobile gaming device 256 may be configured to provide safeguards that prevent the mobile gaming device 256 from being used by an unauthorized person. For example, some mobile gaming devices 256 may include one or more biometric sensors and may be configured to receive input via the biometric sensor(s) to verify the identity of an authorized patron. Some mobile gaming devices 256 may be configured to function only within a predetermined or configurable area, such as a casino gaming area.

Figure 2C:
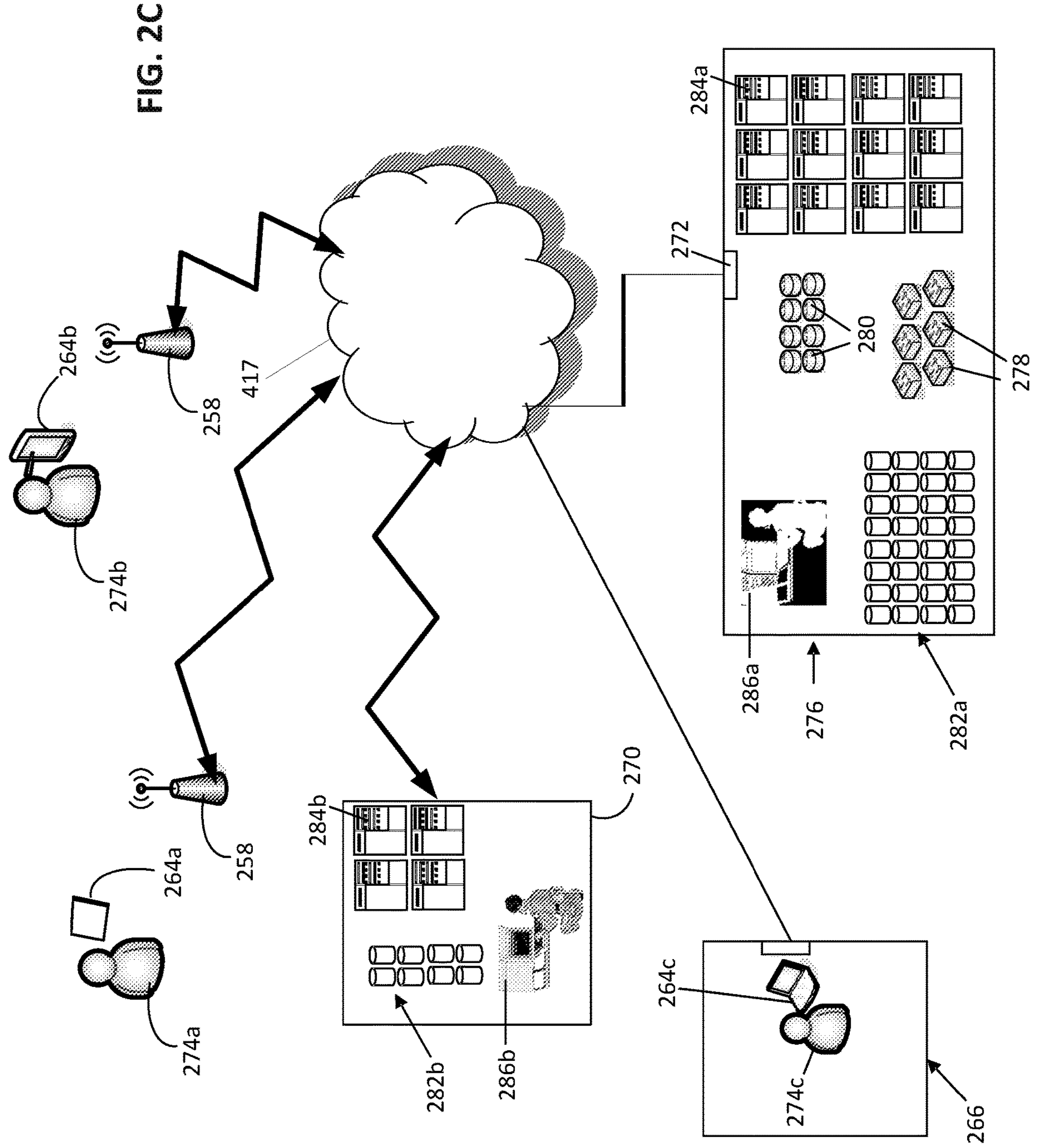
FIG. 2C is a diagram that shows examples of components of a system for providing online gaming according to some aspects of the present disclosure.

FIG. 2C is a diagram that shows examples of components of a system for providing online gaming according to some aspects of the present disclosure. As with other figures presented in this disclosure, the numbers, types and arrangements of gaming devices shown in FIG. 2C are merely shown by way of example. In this example, various gaming devices, including but not limited to end user devices (EUDs) 264*a*, 264*b* and 264*c* are capable of communication via one or more networks 417. The networks 417 may, for example, include one or more cellular telephone networks, the Internet, etc. In this example, the EUDs 264*a* and 264*b* are mobile devices: according to this example the EUD 264*a* is a tablet device and the EUD 264*b* is a smart phone. In this implementation, the EUD 264*c* is a laptop computer that is located within a residence 266 at the time depicted in FIG. 2C. Accordingly, in this example the hardware of EUDs is not specifically configured for online gaming, although each EUD is configured with software for online gaming. For example, each EUD may be configured with a web browser. Other implementations may include other types of EUD, some of which may be specifically configured for online gaming.

In this example, a gaming data center 276 includes various devices that are configured to provide online wagering games via the networks 417. The gaming data center 276 may, for example, be a remote gaming server (RGS) or similar system in some implementations. The gaming data center 276 is capable of communication with the networks 417 via the gateway 272. In this example, switches 278 and routers 280 are configured to provide network connectivity for devices of the gaming data center 276, including storage devices 282*a*, servers 284*a* and one or more workstations 570*a*. The servers 284*a* may, for example, be configured to provide access to a library of games for online game play. In some examples, code for executing at least some of the games may initially be stored on one or more of the storage devices 282*a*. The code may be subsequently loaded onto a server 284*a* after selection by a player via an EUD and communication of that selection from the EUD via the networks 417. The server 284*a* onto which code for the selected game has been loaded may provide the game according to selections made by a player and indicated via the player's EUD. In other examples, code for executing at least some of the games may initially be stored on one or more of the servers 284*a*. Although only one gaming data center 276 is shown in FIG. 2C, some implementations may include multiple gaming data centers 276.

In this example, a financial institution data center 270 is also configured for communication via the networks 417. Here, the financial institution data center 270 includes servers 284*b*, storage devices 282*b*, and one or more workstations 286*b*. According to this example, the financial institution data center 270 is configured to maintain financial accounts, such as checking accounts, savings accounts, loan accounts, etc. In some implementations one or more of the authorized users 274*a*-274*c* may maintain at least one financial account with the financial institution that is serviced via the financial institution data center 270.

According to some implementations, the gaming data center 276 may be configured to provide online wagering games in which money may be won or lost. According to some such implementations, one or more of the servers 284*a* may be configured to monitor player credit balances, which may be expressed in game credits, in currency units, or in any other appropriate manner. In some implementations, the server(s) 284*a* may be configured to obtain financial credits from and/or provide financial credits to one or more financial institutions, according to a player's "cash in" selections, wagering game results and a player's "cash out" instructions. According to some such implementations, the server(s) 284*a* may be configured to electronically credit or debit the account of a player that is maintained by a financial institution, e.g., an account that is maintained via the financial institution data center 270. The server(s) 284*a* may, in some examples, be configured to maintain an audit record of such transactions.

In some alternative implementations, the gaming data center 276 may be configured to provide online wagering games for which credits may not be exchanged for cash or the equivalent. In some such examples, players may purchase game credits for online game play, but may not "cash out" for monetary credit after a gaming session. Moreover, although the financial institution data center 270 and the gaming data center 276 include their own servers and storage devices in this example, in some examples the financial institution data center 270 and/or the gaming data center 276 may use offsite "cloud-based" servers and/or storage devices. In some alternative examples, the financial institution data center 270 and/or the gaming data center 276 may rely entirely on cloud-based servers.

One or more types of devices in the gaming data center 276 (or elsewhere) may be capable of executing middleware, e.g., for data management and/or device communication. Authentication information, player tracking information, etc., including but not limited to information obtained by EUDs 264 and/or other information regarding authorized users of EUDs 264 (including but not limited to the authorized users 274*a*-274*c*), may be stored on storage devices 282 and/or servers 284. Other game-related information and/or software, such as information and/or software relating to leaderboards, players currently playing a game, game themes, game-related promotions, game competitions, etc., also may be stored on storage devices 282 and/or servers 284. In some implementations, some such game-related software may be available as "apps" and may be downloadable (e.g., from the gaming data center 276) by authorized users.

In some examples, authorized users and/or entities (such as representatives of gaming regulatory authorities) may obtain gaming-related information via the gaming data center 276. One or more other devices (such EUDs 264 or devices of the gaming data center 276) may act as intermediaries for such data feeds. Such devices may, for example, be capable of applying data filtering algorithms, executing data summary and/or analysis software, etc. In some implementations, data filtering, summary and/or analysis software may be available as "apps" and downloadable by authorized users.

Figure 3:
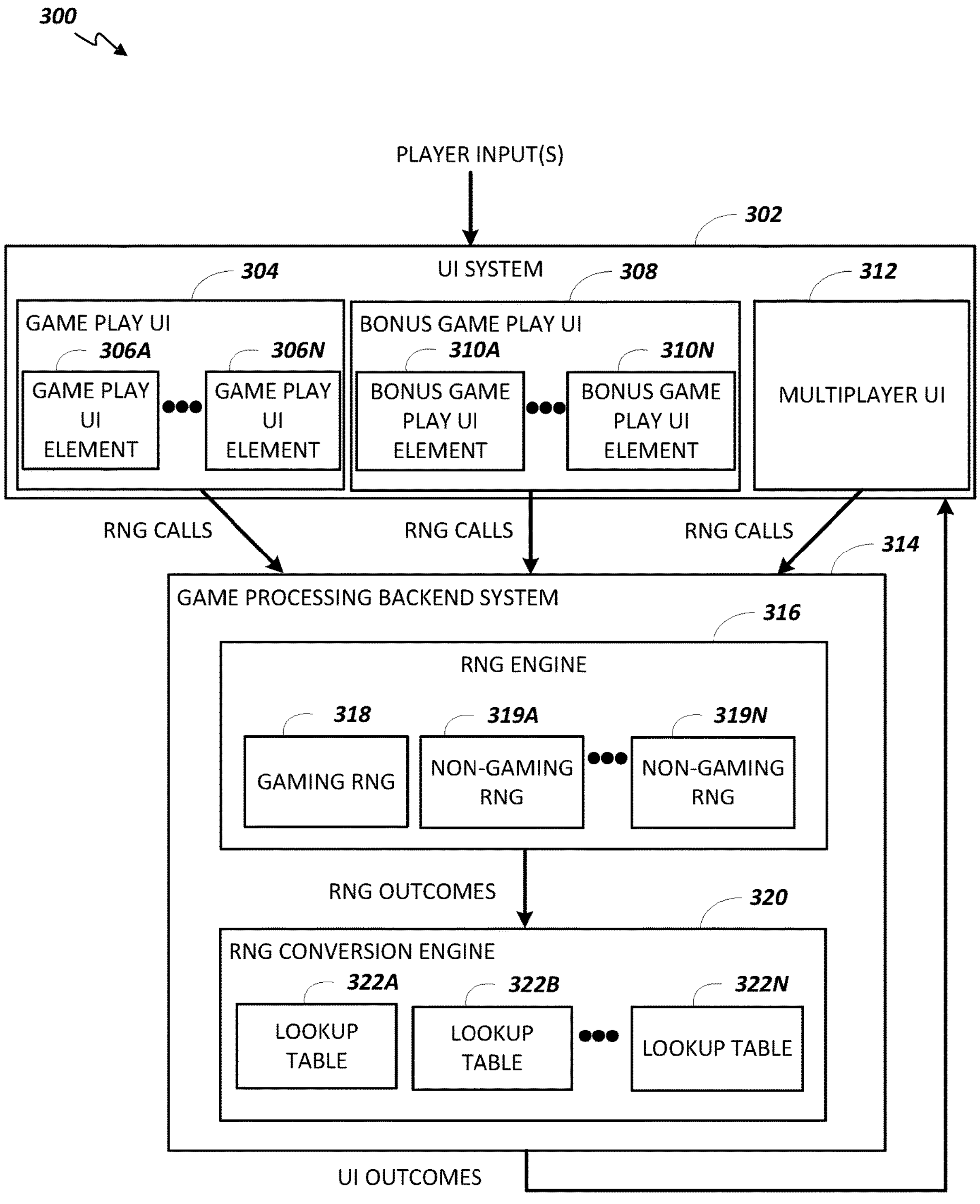
FIG. 3 illustrates, in block diagram form, an implementation of a game processing architecture algorithm that implements a game processing pipeline for the play of a game in accordance with various implementations described herein.

FIG. 3 illustrates, in block diagram form, an implementation of a game processing architecture 300 that implements a game processing pipeline for the play of a game in accordance with various implementations described herein. As shown in FIG. 3, the gaming processing pipeline starts with having a UI system 302 receive one or more player inputs for the game instance. Based on the player input(s), the UI system 302 generates and sends one or more RNG calls to a game processing backend system 314. Game processing backend system 314 then processes the RNG calls with RNG engine 316 to generate one or more RNG outcomes. The RNG outcomes are then sent to the RNG conversion engine 320 to generate one or more game outcomes for the UI system 302 to display to a player. The game processing architecture 300 can implement the game processing pipeline using a gaming device, such as gaming devices 104A-104X and 200 shown in FIGS. 1 and 2, respectively. Alternatively, portions of the gaming processing architecture 300 can implement the game processing pipeline using a gaming device and one or more remote gaming devices, such as central determination gaming system server 106 shown in FIG. 1.

The UI system 302 includes one or more UIs that a player can interact with. The UI system 302 could include one or more game play UIs 304, one or more bonus game play UIs 308, and one or more multiplayer UIs 312, where each UI type includes one or more mechanical UIs and/or graphical UIs (GUIs). In other words, game play UI 304, bonus game play UI 308, and the multiplayer UI 312 may utilize a variety of UI elements, such as mechanical UI elements (e.g., physical "spin" button or mechanical reels) and/or GUI elements (e.g., virtual reels shown on a video display or a virtual button deck) to receive player inputs and/or present game play to a player. Using FIG. 3 as an example, the different UI elements are shown as game play UI elements 306A-306N and bonus game play UI elements 310A-310N.

The game play UI 304 represents a UI that a player typically interfaces with for a base game. During a game instance of a base game, the game play UI elements 306A-306N (e.g., GUI elements depicting one or more virtual reels) are shown and/or made available to a user. In a subsequent game instance, the UI system 302 could transition out of the base game to one or more bonus games. The bonus game play UI 308 represents a UI that utilizes bonus game play UI elements 310A-310N for a player to interact with and/or view during a bonus game. In one or more implementations, at least some of the game play UI element 306A-306N are similar to the bonus game play UI elements 310A-310N. In other implementations, the game play UI element 306A-306N can differ from the bonus game play UI elements 310A-310N.

FIG. 3 also illustrates that UI system 302 could include a multiplayer UI 312 purposed for game play that differs or is separate from the typical base game. For example, multiplayer UI 312 could be set up to receive player inputs and/or presents game play information relating to a tournament mode. When a gaming device transitions from a primary game mode that presents the base game to a tournament mode, a single gaming device is linked and synchronized to other gaming devices to generate a tournament outcome. For example, multiple RNG engines 316 corresponding to each gaming device could be collectively linked to determine a tournament outcome. To enhance a player's gaming experience, tournament mode can modify and synchronize sound, music, reel spin speed, and/or other operations of the gaming devices according to the tournament game play. After tournament game play ends, operators can switch back the gaming device from tournament mode to a primary game mode to present the base game. Although FIG. 3 does not explicitly depict that multiplayer UI 312 includes UI elements, multiplayer UI 312 could also include one or more multiplayer UI elements.

Based on the player inputs, the UI system 302 could generate RNG calls to a game processing backend system 314. As an example, the UI system 302 could use one or more application programming interfaces (APIs) to generate the RNG calls. To process the RNG calls, the RNG engine 316 could utilize gaming RNG 318 and/or non-gaming RNGs 319A-319N. Gaming RNG 318 could corresponds to RNG 212 or hardware RNG 244 shown in FIG. 2A. As previously discussed with reference to FIG. 2A, gaming RNG 318 often performs specialized and non-generic operations that comply with regulatory and/or game requirements. For example, because of regulation requirements, gaming RNG 318 could correspond to RNG 212 by being a cryptographic RNG or pseudorandom number generator (PRNG) (e.g., Fortuna PRNG) that securely produces random numbers for one or more game features. To securely generate random numbers, gaming RNG 318 could collect random data from various sources of entropy, such as from an operating system (OS) and/or a hardware RNG (e.g., hardware RNG 244 shown in FIG. 2A). Alternatively, non-gaming RNGs 319A-319N may not be cryptographically secure and/or be computationally less expensive. Non-gaming RNGs 319A-319N can, thus, be used to generate outcomes for non-gaming purposes. As an example, non-gaming RNGs 319A-319N can generate random numbers for generating random messages that appear on the gaming device.

The RNG conversion engine 320 processes each RNG outcome from RNG engine 316 and converts the RNG outcome to a UI outcome that is feedback to the UI system 302. With reference to FIG. 2A, RNG conversion engine 320 corresponds to RNG conversion engine 210 used for game play. As previously described, RNG conversion engine 320 translates the RNG outcome from the RNG 212 to a game outcome presented to a player. RNG conversion engine 320 utilizes one or more lookup tables 322A-322N to regulate a prize payout amount for each RNG outcome and how often the gaming device pays out the derived prize payout amounts. In one example, the RNG conversion engine 320 could utilize one lookup table to map the RNG outcome to a game outcome displayed to a player and a second lookup table as a pay table for determining the prize payout amount for each game outcome. In this example, the mapping between the RNG outcome and the game outcome controls the frequency in hitting certain prize payout amounts. Different lookup tables could be utilized depending on the different game modes, for example, a base game versus a bonus game.

After generating the UI outcome, the game processing backend system 314 sends the UI outcome to the UI system 302. Examples of UI outcomes are symbols to display on a video reel or reel stops for a mechanical reel. In one example, if the UI outcome is for a base game, the UI system 302 updates one or more game play UI elements 306A-306N, such as symbols, for the game play UI 304. In another example, if the UI outcome is for a bonus game, the UI system could update one or more bonus game play UI elements 310A-310N (e.g., symbols) for the bonus game play UI 308. In response to updating the appropriate UI, the player may subsequently provide additional player inputs to initiate a subsequent game instance that progresses through the game processing pipeline.

Systems such as those discussed above, e.g., with respect to FIGS. 2A and 3, may be used to provide games of chance such as those discussed herein. For example, the RNG engine of FIG. 3 may be used to provide randomized outcomes that may be used to select symbols from symbol sets, to select which tier of scatter prize indicator is associated with each symbol position, or to select which set of symbols to use when selecting a symbol for a given symbol position.

Figure 4:
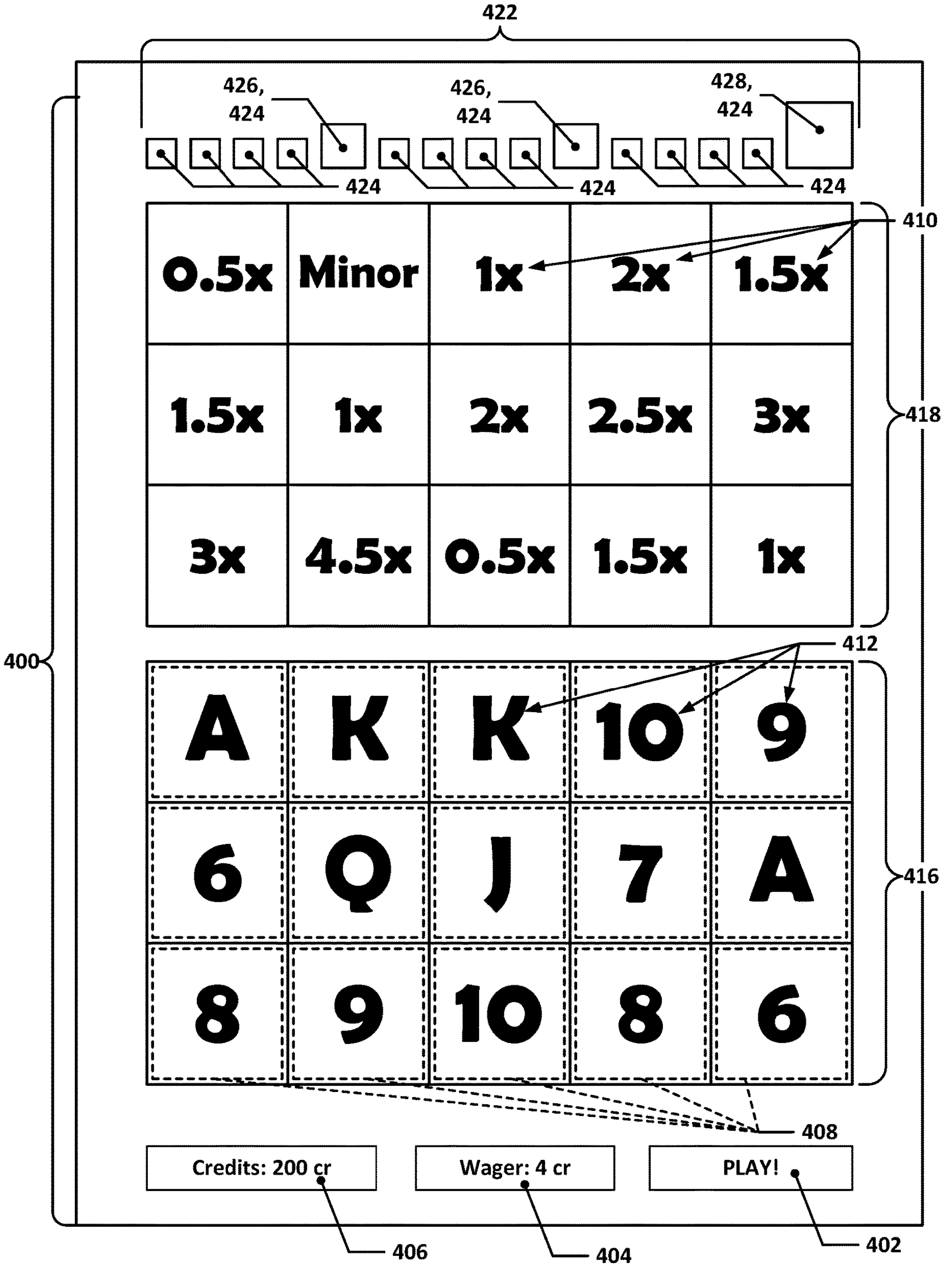
FIG. 4 depicts a GUI that may be used for providing a game of chance according to one implementation discussed in the present disclosure.

FIG. 4 depicts a GUI for providing a game of chance according to one implementation discussed in the present disclosure. In FIG. 4, a game of chance is depicted in which a plurality of symbol positions 408 are shown. In the example GUI 400, there are 15 symbol positions arranged in a first pattern 416, which is a 5×3 rectangular array in this example, but it will be understood that other implementations may feature a first pattern with a different number of symbol positions and/or a different arrangement of symbol positions, including arrangements that are not rectangular arrays.

During each play of the game of chance, symbols 412 (only three are called out, but each symbol position may generally be used to display symbols 412) are typically randomly selected for display in the symbol positions 408. However, it is to be understood that in some implementations, some games of chance may randomly select symbols 412 for only some of the symbol positions 408 under some circumstances. For example, the game of chance may incorporate a "sticky wild" feature in which a wild symbol that is treated as equivalent to any other symbol may be retained in a given symbol location for a predetermined number of plays after being initially selected for display in that symbol location. In such an implementation, symbol selections may not occur for the symbol position in which the sticky wild symbol is shown until after the predetermined number of plays have occurred with the sticky wild symbol retained in that symbol position.

The symbols that are shown in the symbol positions may, during at least non-feature game mode play, be evaluated after each play to determine if one or more winning patterns are formed by the displayed symbols. For example, the displayed symbols along each of a plurality of paylines may be evaluated to see if the symbols along any of the paylines forms a winning pattern, and an award provided if so. In this respect, the game of chance operates similarly to many slot-machine type games of chance, and further discussion of this aspect of the game of chance is thus avoided in the interest of brevity.

Also shown in the GUI 400 of FIG. 4 is a corresponding pattern 418 of scatter prize indicators 410. Each scatter prize indicator 410 is associated with a corresponding one of the symbol position 408. The corresponding pattern 418 of scatter prize indicators replicates the first pattern 416 of symbol positions 408, but in a location that is vertically offset from the first pattern 416. Each scatter prize indicator 410 is positioned within the corresponding pattern 418 in the same relative pattern location as the associated symbol position 408 is located in in the first pattern 416. This makes it very intuitive for players to be able to rapidly understand which scatter prize indicator 410 is associated with which symbol position 408. In other implementations, such as in FIG. 5 (which is otherwise identical to FIG. 4), the scatter prize indicators 410 may instead be overlaid on or otherwise collocated with the symbol positions 408.

The GUI 400 of FIG. 4 also depicts a progress indicator 422 which may include a plurality of progress increments 424. The progress indicator 422 may graphically depict how may times the feature game mode for the game of chance has been activated since a particular point in time, e.g., since the progress indicator 422 was last reset or reinitialized. During game play, a different one of the progress increments 424 may be modified, e.g., changed in appearance, each time the feature game mode is activated to reflect the fact that another feature game mode activation has occurred. In the progress indicator 422, the first activation of the feature game mode would cause the left-most progress increment to change to a different color or be shaded in, the second activation of the feature game mode would cause the second progress increment from the left to change to a different color or be shaded in, and so forth.

Certain progress increments 424 may be caused to be displayed differently from other progress increments 424. For example, the fifth and tenth progress increments 424 (also labeled as 426) from the left are larger than the first through fourth and sixth through ninth progress increments, and the fifteenth progress increment 424 (also labeled 428) from the left is larger than all of the other progress increments 424. Such progress increments 424 that are differently sized, shaped, or otherwise differentiated from the other progress increments 424 may represent progress increments 424 which, if reached, may result in a particular enhancement of the feature game mode to occur. For example, a first enhancement may be triggered when the feature game mode is activated for the fifth and tenth times, and a second enhancement may be triggered when the feature game mode is activated for the fifteenth time.

The GUI 400 also includes information indicating a credit balance 406, a current wager amount 404, and a play button 402. The credit balance 406 may indicate the number of credits available for use in playing the game of chance and may be adjusted upward or downward in connection with each play of the game of chance. The wager amount 404 may indicate the amount that will be wagered for each play of the game of chance, and the play button 402 may be a user-selectable control (or physical button) that may be selected by a player to initiate a play of the game of chance.

As can be seen, the scatter prize indicators 410 vary—ranging from 0.5× to "Minor." During initialization of the scatter prize indicators 410, scatter prize indicators may be selected from a plurality of different tiers of scatter prize indicators. Such selection may be random or somewhat random (for example, preset numbers of scatter prize indicators of different tiers may be selected, but then randomly assigned to particular symbol positions).

Figures 5, 6:
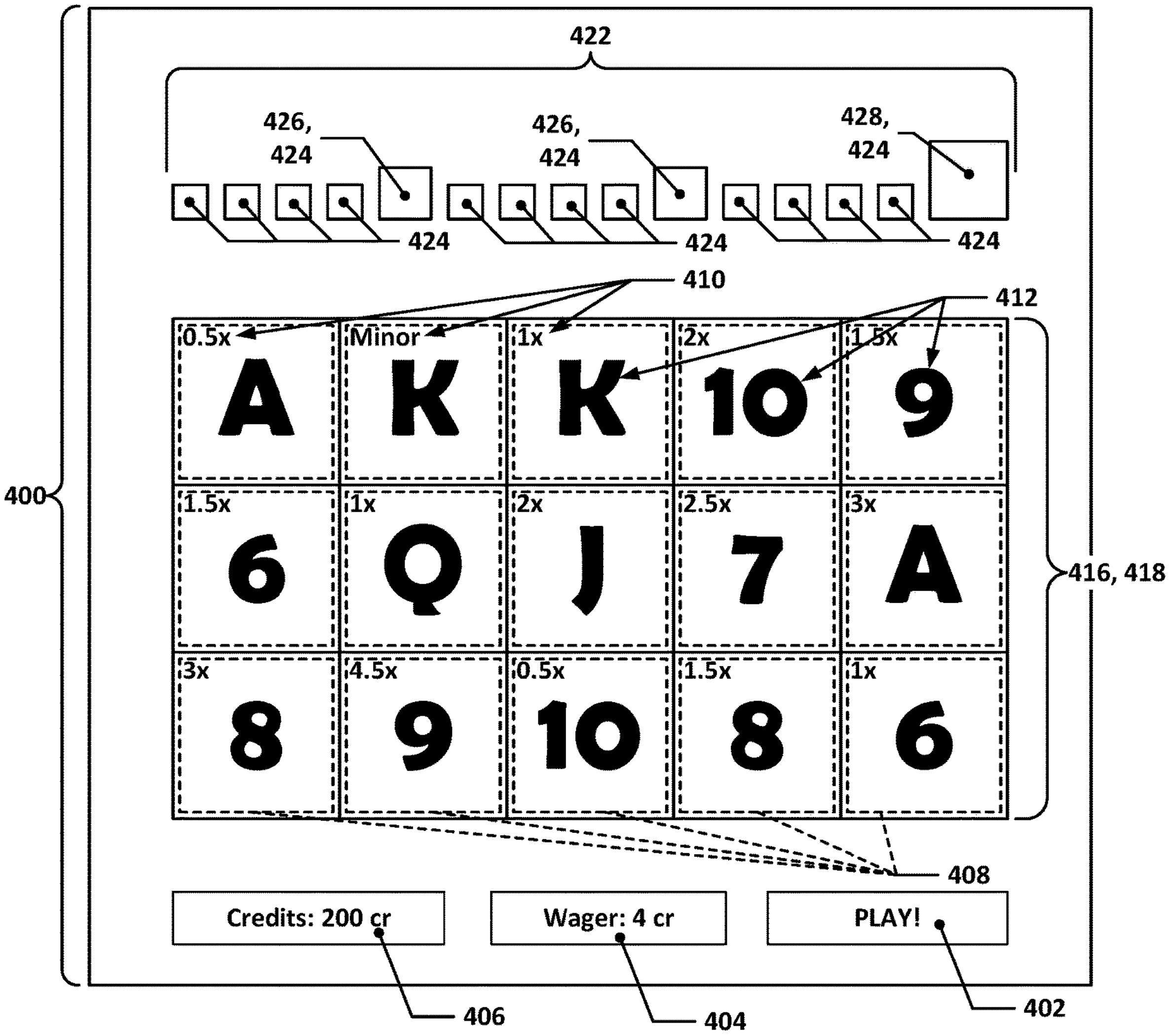
FIG. 5 depicts an alternate version of the GUI of FIG. 4 with the scatter prize indicators collocated with their associated symbol positions.
FIG. 6 depicts a table of example scatter prize indicators.

In this example, the scatter prize indicators are selected from a set of 14 different tiers of scatter prize indicators, with the first ten scatter prize indicators each corresponding to a multiplier value that is a different multiple of 0.5, e.g., 0.5, 1, 1.5, 2, etc. FIG. 6 depicts a table shown the various tiers of scatter prize indicators used in the present example; other implementations may use other scatter prize indicators. For the first nine of these scatter prize indicators, the graphic that is used to represent the scatter prize indicator is directly indicative of the multiplier effect that that scatter prize indicator will have on the player's award should an award be provided based on that scatter prize indicator. The tenth scatter prize indicator in this group departs from this convention and is instead labeled as "Mini." The eleventh through fourteenth scatter prize indicators also depart from this convention, having names like "Minor," "Maxi," "Major," and "Grand," but also provide a more pronounced effect on any award based thereupon, e.g., multiplying such an award by 10, 20, 40, or 500 times, respectively.

It will be understood that while the scatter prize indicators used in this example are multiplier values, e.g., that may be used to multiply the amount wagered for each play of the game of chance in order to determine a corresponding award amount, other implementations may instead award a fixed credit amount for at least some or all of the scatter prize indicators. It will also be appreciated that there may be some scatter prize indicators that are linked to progressive awards. For example, the Mini through Grand scatter prize indicators may each be linked to a corresponding progressive award that is funded through small contributions made from each wager placed on a large number of gaming machines. Such progressive awards may, upon being won, reset to zero or to a base or default starting value. Moreover, in some implementations, such progressive awards may be in addition to a fixed credit amount or credits based on a multiplier value. While the present example is discussed with respect to scatter prize indicators that are (or are associated with) multipliers, it will be understood that any suitable scatter prize indicator may be used, including those discussed above.

FIGS. 7 through 20 depict the GUI 400 of FIG. 4 during various stages of game play. For brevity, depictions of the GUI 400 during typical non-feature game mode play are omitted, as such depictions may generally be similar to the game play of most slot machines.

Figure 7:
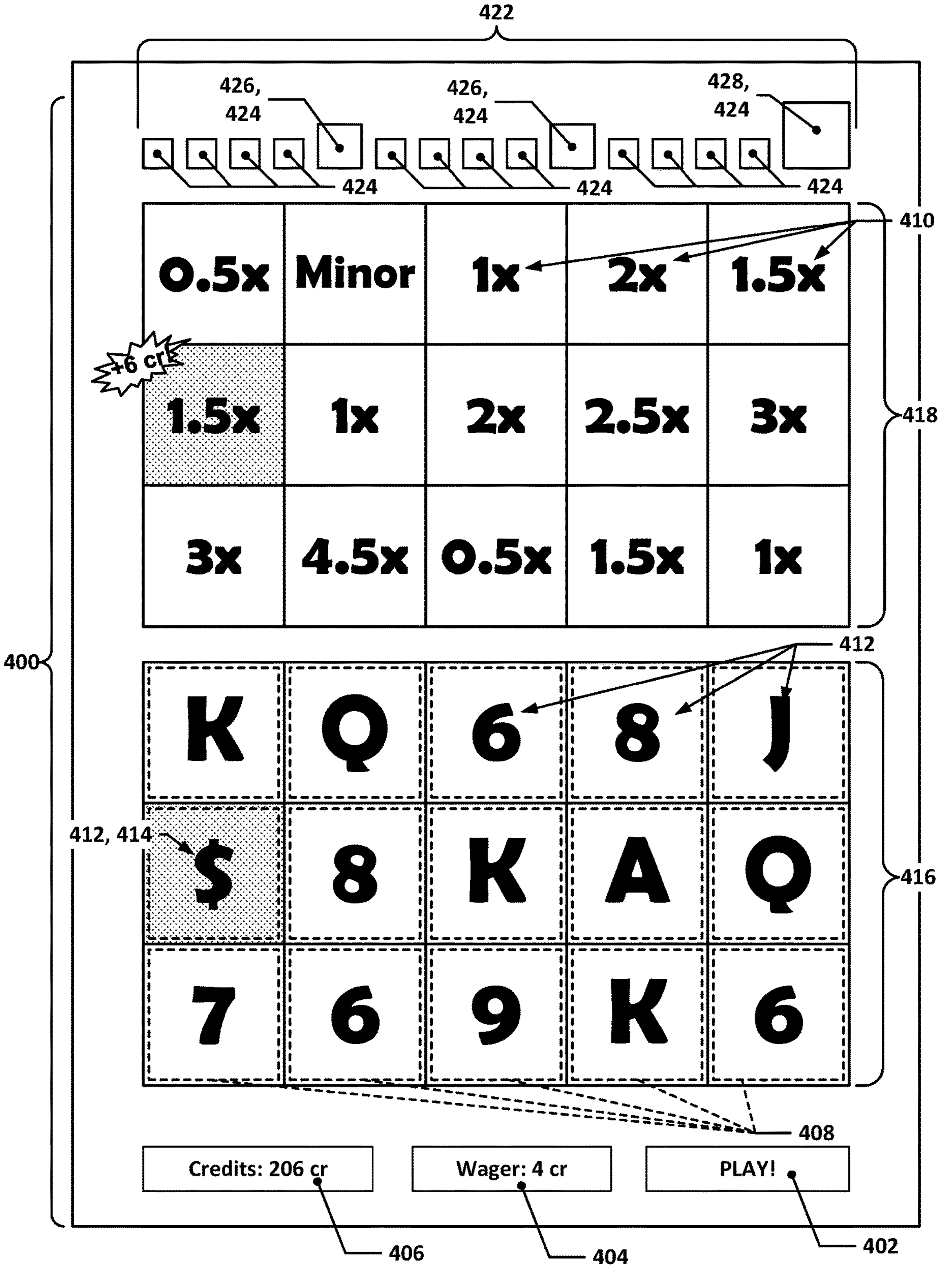
FIGS. 7 through 20 depict various stages of operation of the GUI in FIG. 4

In FIG. 7, a play of the game of chance has just concluded, and symbols 412 have been selected for display in each of the symbol positions 408. The symbol 412 selected for display in the symbol position 408 in the leftmost column, middle row of symbol positions 408 is a symbol of a first type of symbol 414 (a "$" in this example; it will be understood that other symbols may be used as the first type of symbol, and that the first type of symbol may actually be inclusive of multiple different specific symbols or graphics, e.g., "$" and "$$" may both be used as the first type of symbol). The first type of symbol 414 may also, for the purposes of discussion herein, potentially be referred to as a "scatter symbol."

As can be seen in FIG. 7, the selection of a symbol 412 of the first type of symbol 414 in the indicated symbol position 408 has caused the player to receive a 6-credit award since the current wager amount of 4 credits is multiplied by the scatter prize indicator 410 multiplier value of 1.5× that is associated with that symbol position 408. The credit balance 406 has been updated to reflect this award, and an optional on-screen graphic showing "+6 cr" overlaid on the corresponding scatter prize indicator 410 provides an additional cue to the player that such an award associated with that scatter prize indicator has been provided.

Figure 8:
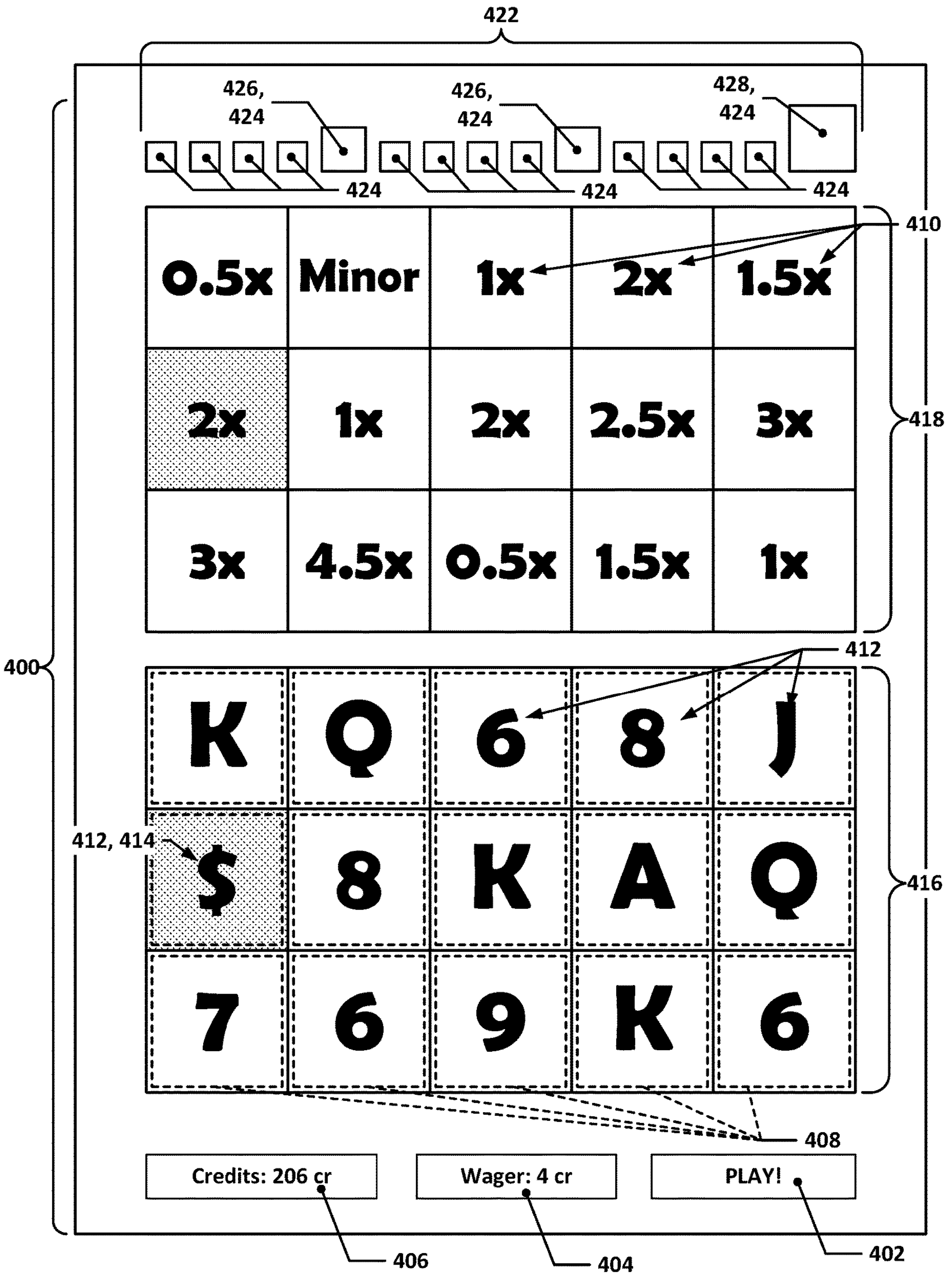

In FIG. 8, the scatter prize indicator 410 associated with the leftmost, middle-row symbol position 408 that is displaying the "$" symbol has been caused to be upgraded to the next higher tier of scatter prize indicator 410. Such an upgrade may be performed, for example, responsive to a determination that the scatter prize indicator 410 in question is actually eligible to be upgraded. For example, the highest-tier scatter prize indicator 410 that could be associated with a given symbol position 408, per the table of FIG. 6, is the "Grand" scatter prize indicator 410. Thus, if a "Grand" scatter prize indicator 410 was associated with a symbol position 408 in which a "$" symbol was displayed, it would not be possible to upgrade that scatter prize indicator 410 any further, and thus there would be no change in that scatter prize indicator 410. In other implementations, however, there may be no fixed limit on the number of tiers of scatter prize indicators, e.g., there may be a mathematical expression or algorithm that may define an award effect for any given tier of scatter prize indicator, regardless of what tier. In such implementations, the condition that must be met in order to upgrade a scatter prize indicator may be omitted; it will be understood that even if omitted, such a condition may still be viewed as existing but being met for all scatter prize indicators, e.g., a non-limiting condition.

Figure 9:
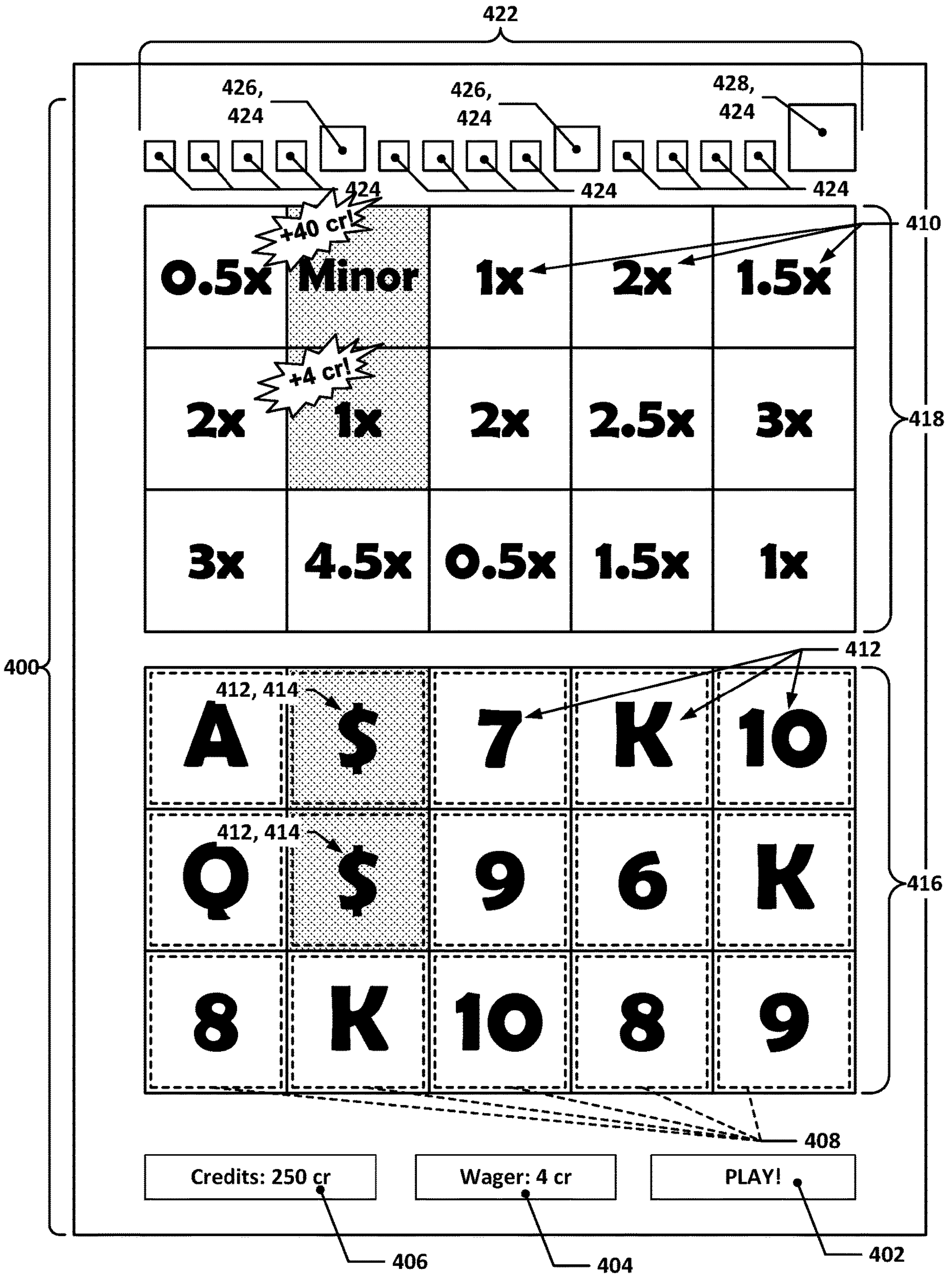

In FIG. 9, a new play of the game of chance has occurred, and the symbol positions 408 in the top two rows of the second column from the left of symbol positions 408 have had symbols 412 of the first type of symbol 414 selected for display therein. The appearance of the "$" symbols in those two symbol positions 408 causes the player to be awarded with awards of 40 and 4 credits. The 40-credit award is based on the player's 4-credit wager multiplied by the 10× multiplier that the "Minor" scatter prize indicator 410 represents (which is associated with the symbol position 408 that is in the top row, second column from the left), and the 4-credit award is based on the 1× multiplier that the "1×" scatter prize indicator represents (which is associated with the symbol position 408 that is in the middle row, second column from the left). The credit balance 406 has been incremented to account for these additional awards.

Figure 10:
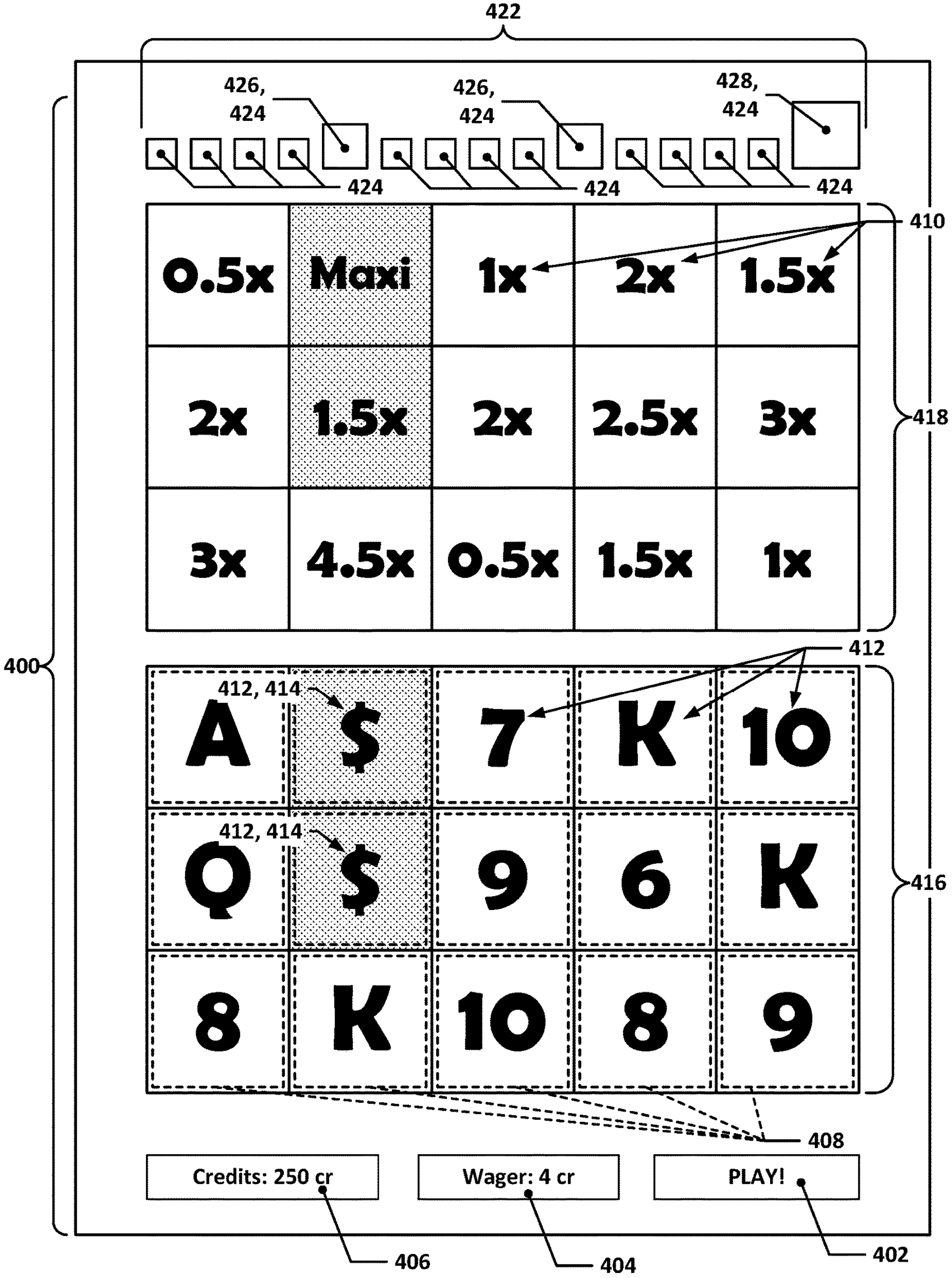

In FIG. 10, the two scatter prize indicators 410 that are associated with the symbol positions showing the "$" symbol have been upgraded to the next-higher tier of scatter prize indicators. The "Minor" scatter prize indicator 410 is thus upgraded to the "Maxi" scatter prize indicator 410, and the "1×" scatter prize indicator 410 immediately therebelow has been upgraded to the "1.5×" scatter prize indicator 410.

Figure 11:
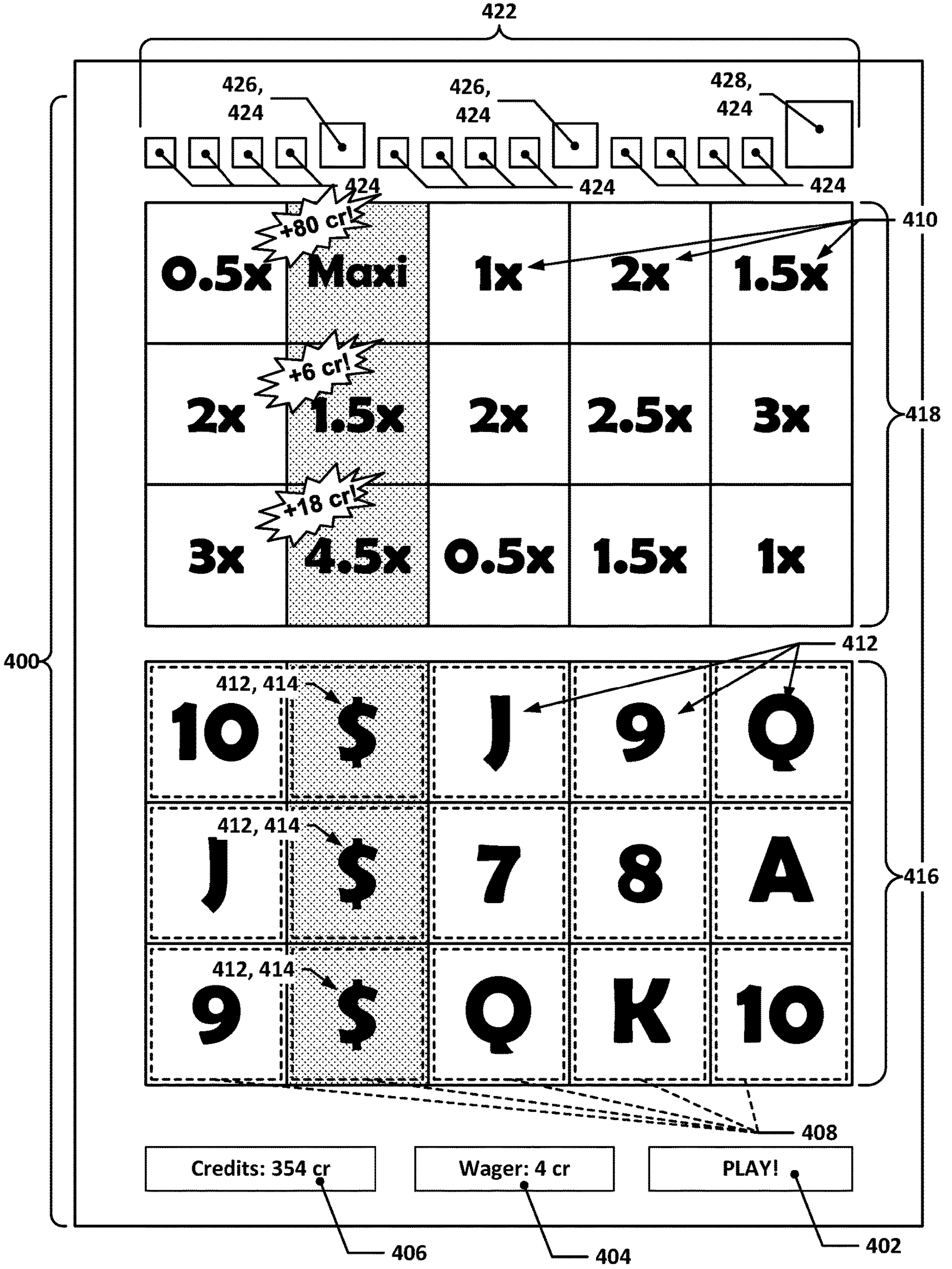

In FIG. 11, another play of the game of chance has occurred, and all of the symbol positions 408 in second column from the left of symbol positions 408 have had symbols 412 of the first type of symbol 414 selected for display therein. The appearance of the "$" symbols in those three symbol positions 408 causes the player to be awarded with awards of 80, 6, and 18 credits. The 80-credit award is based on the player's 4-credit wager multiplied by the 20× multiplier that the "Maxi" scatter prize indicator 410 represents (which is associated with the symbol position 408 that is in the top row, second column from the left), the 6-credit award is based on the 1.5× multiplier that the "1.5×" scatter prize indicator represents (which is associated with the symbol position 408 that is in the middle row, second column from the left), and the 18-credit award is based on the 4.5× multiplier that the "4.5×" scatter prize indicator represents (which is associated with the symbol position 408 that is in the bottom row, second column from the left). The credit balance 406 has been incremented to account for these additional awards.

Figure 12:
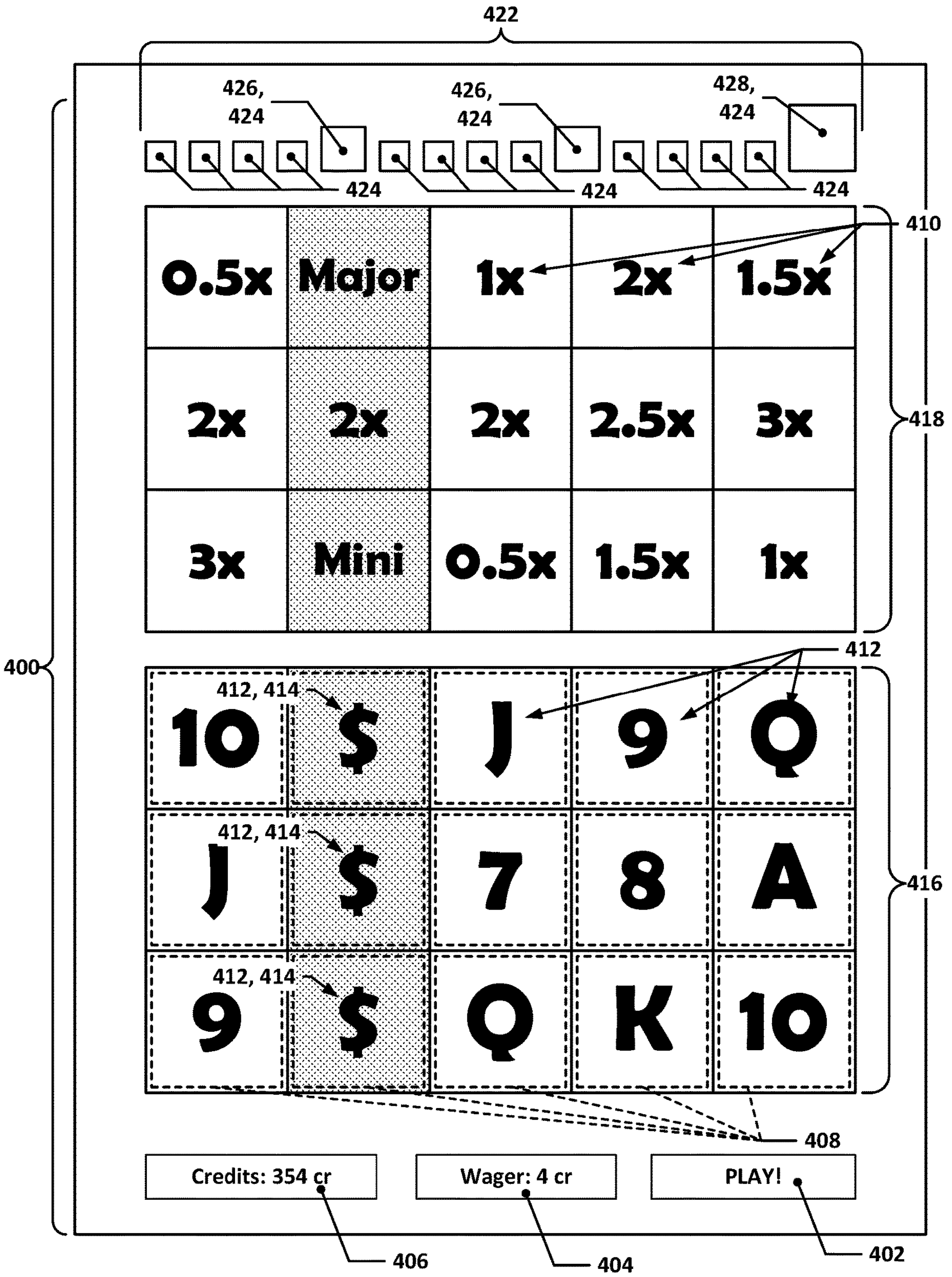

In FIG. 12, the three scatter prize indicators 410 that are associated with the symbol positions showing the "$" symbol have been upgraded to the next-higher tier of scatter prize indicators. The "Maxi" scatter prize indicator 410 is thus upgraded to the "Major" scatter prize indicator 410, the "1.5×" scatter prize indicator 410 immediately therebelow has been upgraded to the "2×" scatter prize indicator 410, and the "4.5×" scatter prize indicator 410 beneath that has been upgraded to the "Mini" scatter prize indicator 410.

The game play discussed above may occur during play of the game of chance while the feature game mode is inactive. The player may thus periodically receive awards when scatter symbols are selected for display and, in tandem with such awards, upgrade the relevant scatter prize indicator 410 such that it provides an enhanced award effect the next time that it is involved in an award determination. Thus, the scatter prize indicators present an ongoing game play feature that persists over multiple plays of the game of chance—a feature that can, over time, be upgraded by a player and thus gives the player a vested interest in continuing play.

Figure 13:
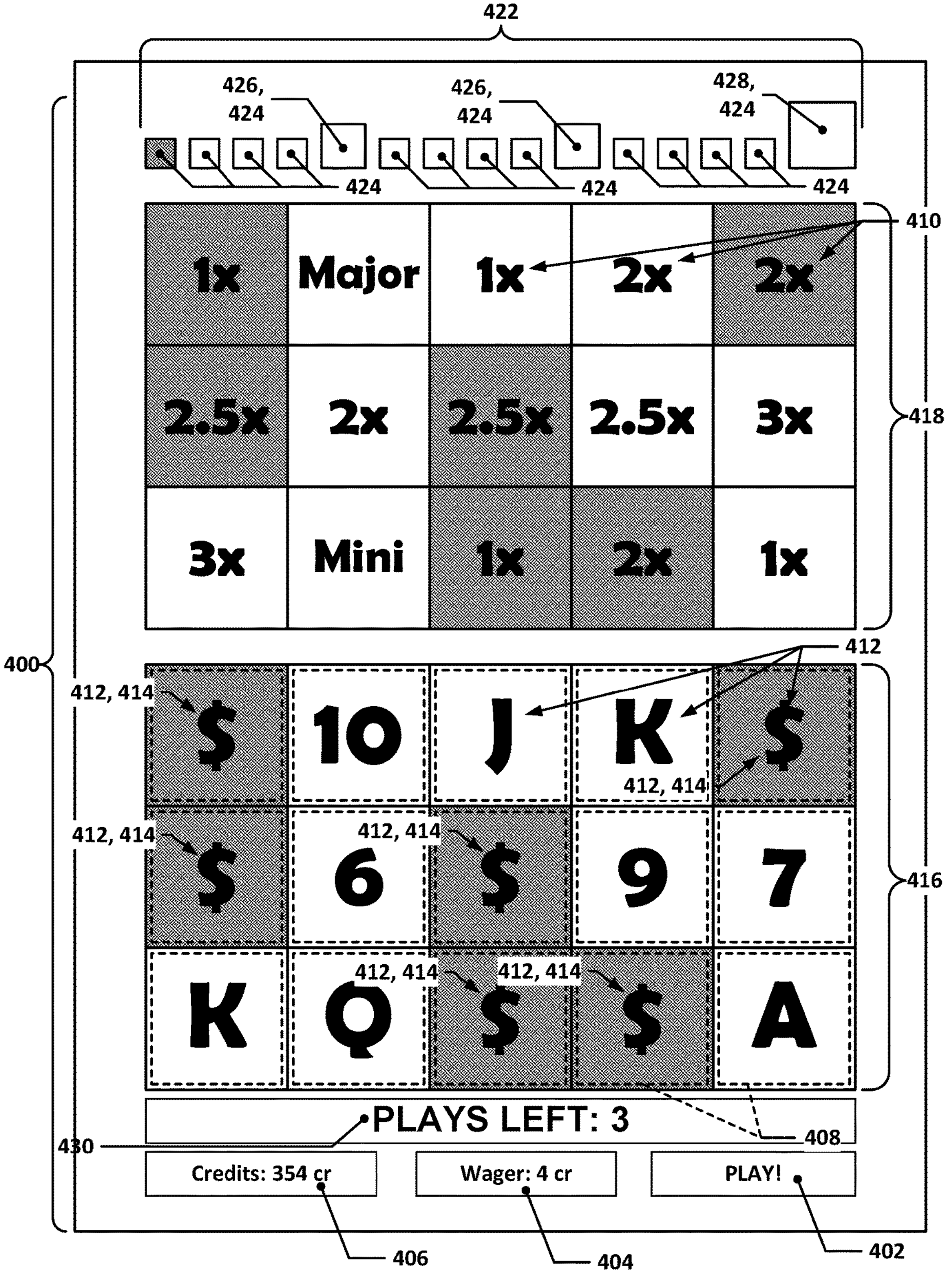

The next GUI Figures depict the GUI 400 during various phases of feature game mode. In FIG. 13, a play of the game of chance has resulted in at least a predetermined number (six, in this example) of symbols 412 of the first type of symbol 414 to be selected and displayed in the symbol positions 408. Responsive to this condition being met, the game of chance has initiated the feature game mode. In the feature game mode, the GUI 400 is caused to further include a play counter 430 that indicates to the player how many plays of the game of chance in the feature game mode remain. In this example, the play counter has been initialized to show a starting value of 3 plays remaining. The GUI 400 may also be caused to provide various other graphics or text to indicate that the feature game mode is active, including the display of basic rules of operation of the feature game mode.

The feature game mode may generally operate in a round-based manner, with the player progressing through one or more rounds of play. The first round of play begins when the feature game mode is initiated, and each subsequent round of play begins when the current round of play concludes (unless the current round of play concludes because of the termination of the feature game mode, in which case no additional round is begun). Each round concludes when all of the symbol positions have been associated with symbols 412 of the first type of symbol 414 during that round.

When the feature game mode is initiated, the transition to feature game mode may occur in a variety of ways. In the depicted example, the symbols 412 of the first type of symbol 414 that triggered the feature game mode are retained in their respective symbol positions 408, and the scatter prize indicators 410 associated with therewith are marked, e.g., with a different color or shading, to indicate that those scatter prize indicators 410 are associated with the corresponding symbol positions 408 that had the symbols 412 of the first type of symbol 414 that triggered the feature game mode associated therewith. The symbol positions 408 of the symbols 412 of the first type of symbol 414 that triggered the feature game mode are similarly shaded or colored, and the symbols 412 of the first type of symbol 414 that triggered the feature game mode may be retained in subsequent plays of the game of chance during that round of play while the feature game mode is active. However, no awards based on the scatter prize indicators 410 are caused to be provided, and the scatter prize indicators 410 are not upgraded. Additionally, the progress indicator 422 has been updated to cause the first progress increment 424 to be shaded in to reflect that an activation of the feature game mode has occurred.

Variations on such transitions include, for example, providing an award based on the scatter prize indicators 410 associated with the symbol positions 408 displaying the symbols 412 of the first type of symbol 414 (as is described above for instances in which a number of symbols 412 of the first type of symbol 414 are obtained that are insufficient to trigger the feature game mode), upgrading the scatter prize indicators 410 associated with the symbol positions 408 displaying the symbols 412 of the first type of symbol 414, not shading or using a different color to mark either or both the symbol positions/symbols or the scatter prize indicators, etc.

In the depicted example, if enough symbols of the first type of symbol are displayed to cause the feature game mode to be triggered, the usual awards that are provided in association with display of symbols of the first type of symbol during non-feature game mode play are not awarded (since the player will be awarded such awards later during feature game mode play). However, in some implementations, if enough symbols of the first type of symbol are displayed to cause the feature game mode to be triggered, then the usual awards that are provided in association with display of symbols of the first type of symbol during non-feature game mode play are still awarded prior to initiation of the feature game mode.

Figure 14:
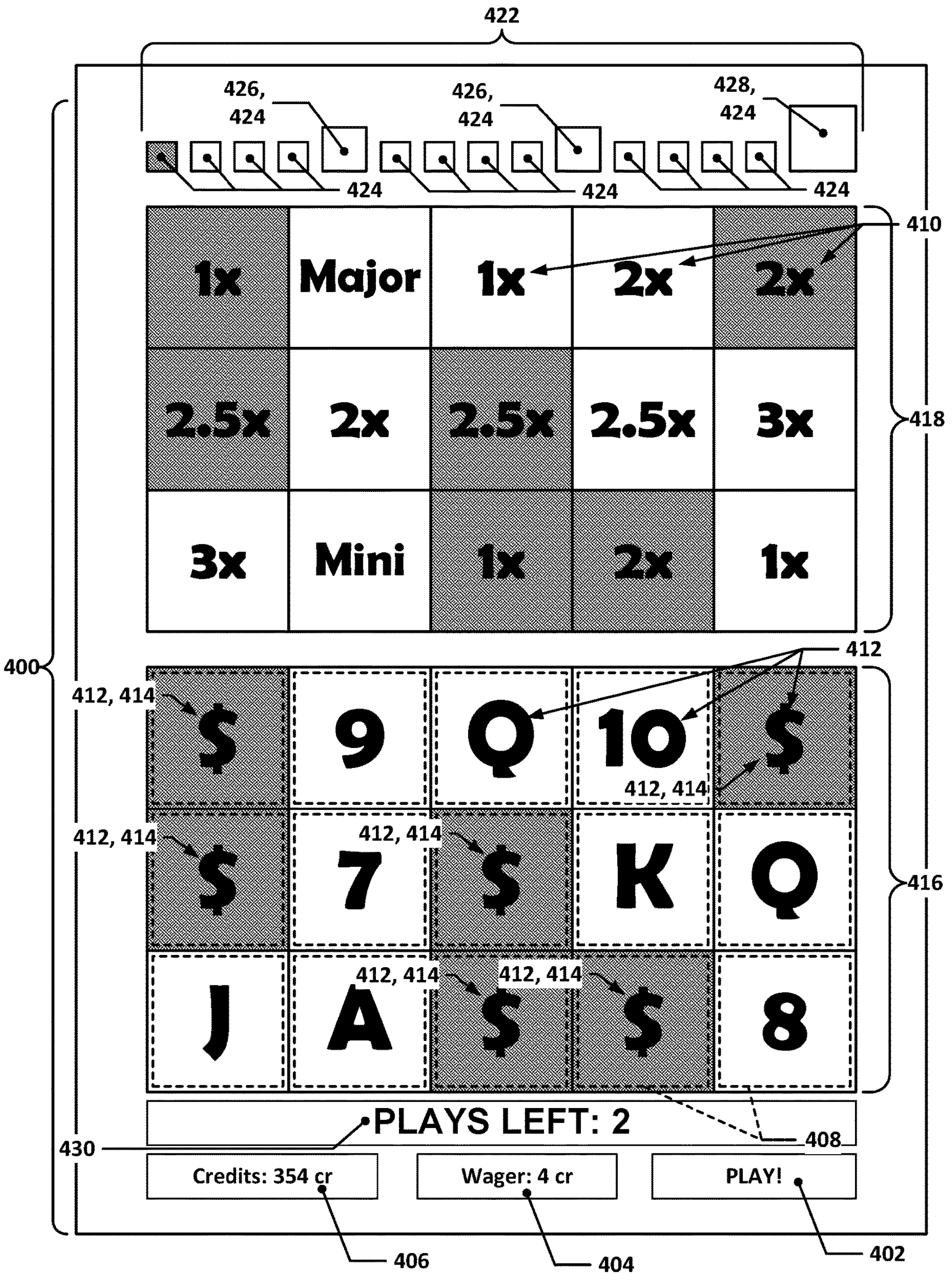

In FIG. 14, a play of the game of chance while the feature game mode is active has resulted in new symbols 412 being selected for each of the symbol positions 408 that were not already associated with symbols 412 of the first type of symbol 414 in the current round of the feature game mode. The newly selected symbols 412, in this case, do not result in any additional symbol positions becoming associated with a symbol 412 of the first type of symbol 414—the only symbol positions 408 that are associated with a symbol 412 of the first type of symbol 414 are those that were already associated with such a symbol 412 earlier in the round, i.e., prior to the selection of the symbols 412 shown in FIG. 14. Accordingly, the play counter 430 is decremented by one, informing the player that they currently have two plays left. If the next two plays of the game of chance do not result in any symbols 412 of the first type of symbol 414 being selected for any of the symbol positions 408 that are not already associated with symbols 412 of the first type of symbol 414, then the two remaining plays of the game of chance in the feature game mode may be used up, and the feature game mode may be terminated.

Figure 15:
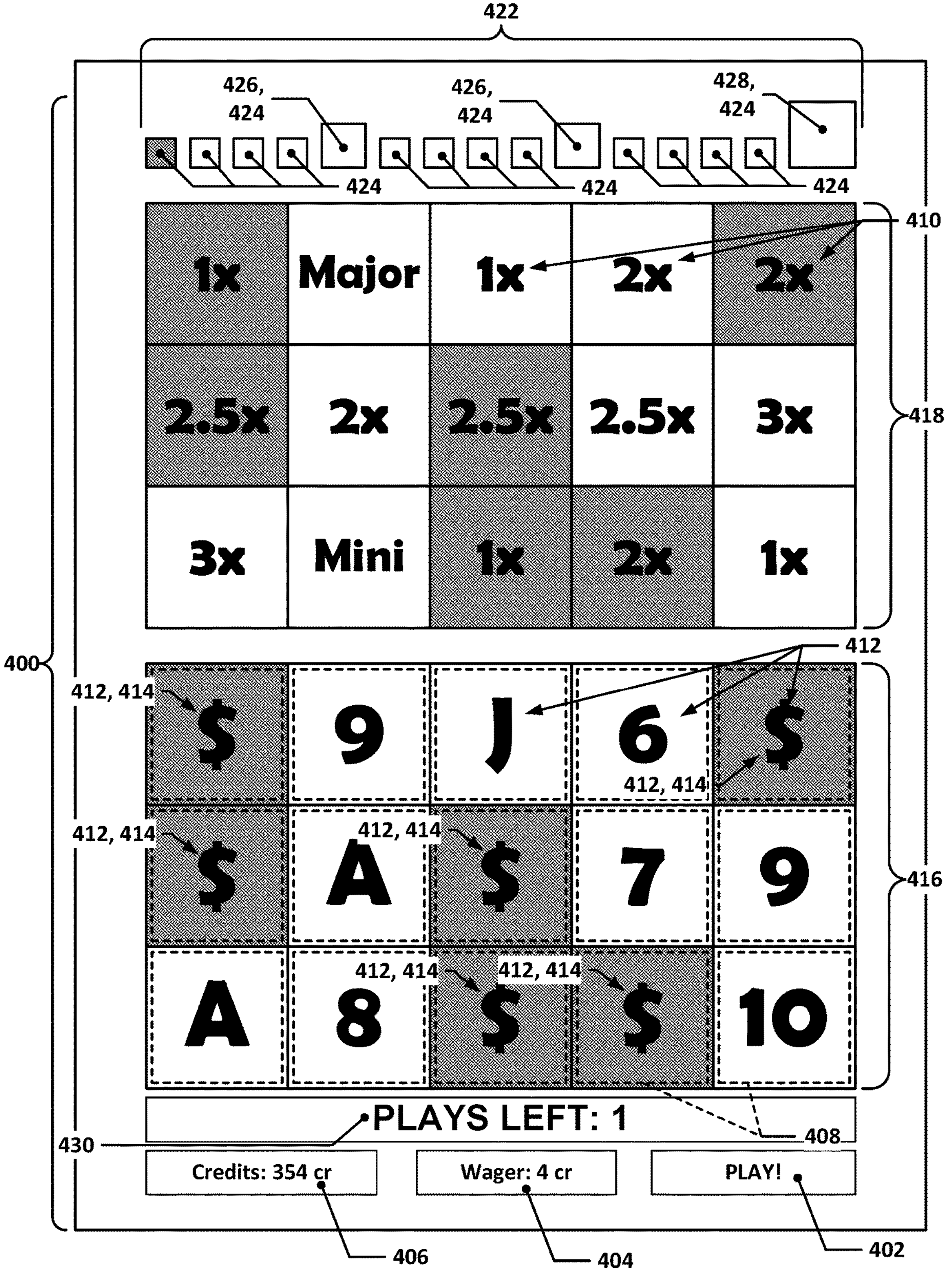

FIG. 15 shows the next symbol 412 selection, in which, again, symbols 412 being selected for each of the symbol positions 408 that were not already associated with symbols 412 of the first type of symbol 414 in the current round of the feature game mode do not include any symbols 412 of the first type of symbol 414. As a result, the play counter 430 has been decremented again.

Figure 16:
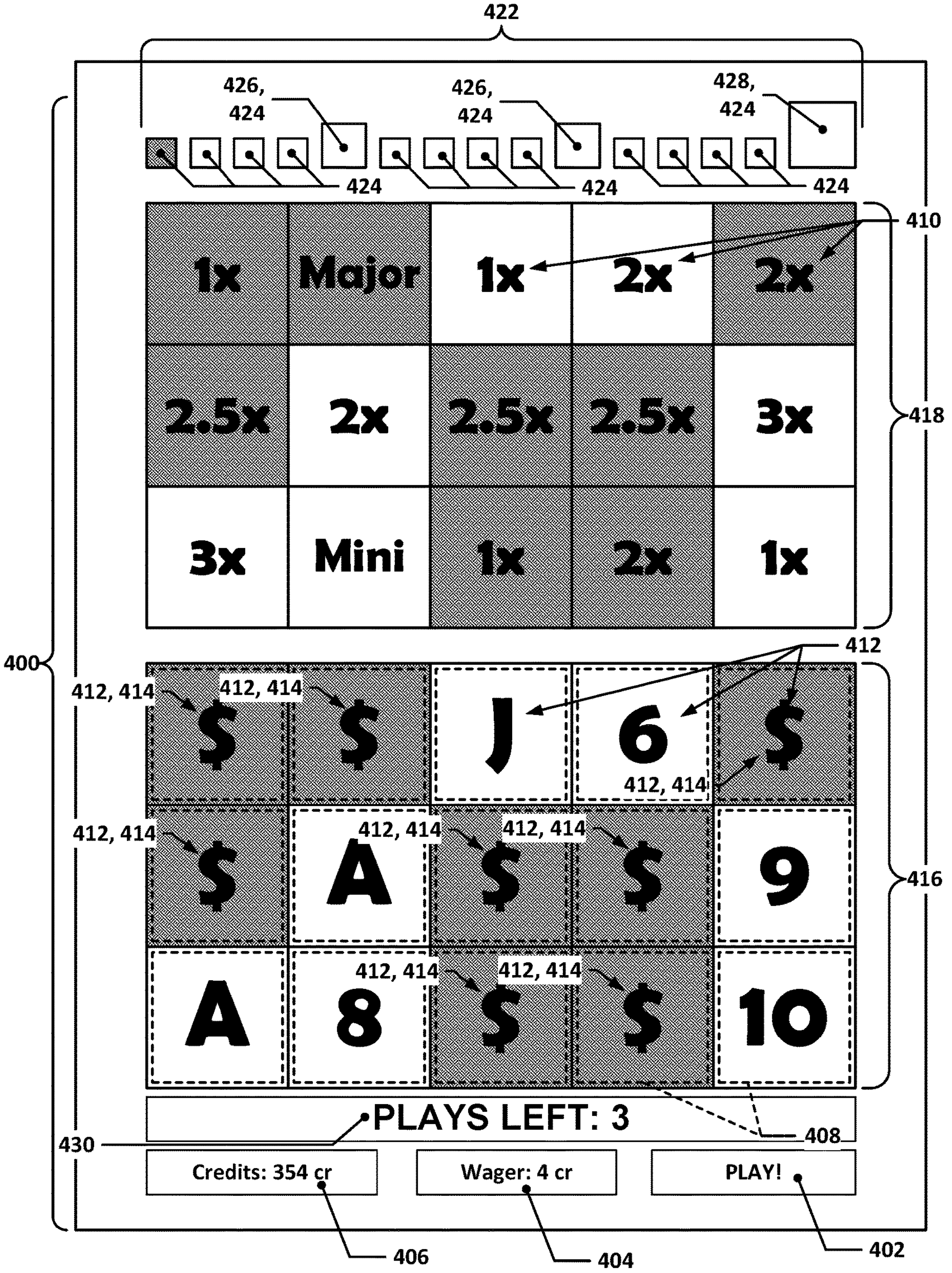

FIG. 16 depicts the GUI 400 after a third play of the game of chance while the feature game mode is active. In this play of the game of chance, which could potentially conclude the feature game mode if no additional symbols 412 of the first type of symbol 414 are associated with the symbol positions 408, the symbol 412 selection has resulted in two of the symbol positions 408 that were not already associated with symbols 412 of the first type of symbol 414 in the current round of the feature game mode to have symbols 412 of the first type of symbol 414 selected for and associated therewith. Thus, the symbol positions 408 in the top row, second column from left, and the middle row, second column from right, have both had symbols 412 of the first type of symbol 414 associated therewith and displayed therein. Those symbol positions 408 and the “Major” and “2×” scatter prize indicators 410 corresponding to those symbol positions 408 have been shaded to indicate their status as being, at least for the current round, effectively “frozen.” Additionally, since a symbol 412 of the first type of symbol 414 has been selected for a symbol position 408 that was not previously associated with a symbol 412 of the first type of symbol 414 in the current round, the play counter 430 has been reset to, for example, its default or starting value (three plays).

Figure 17:
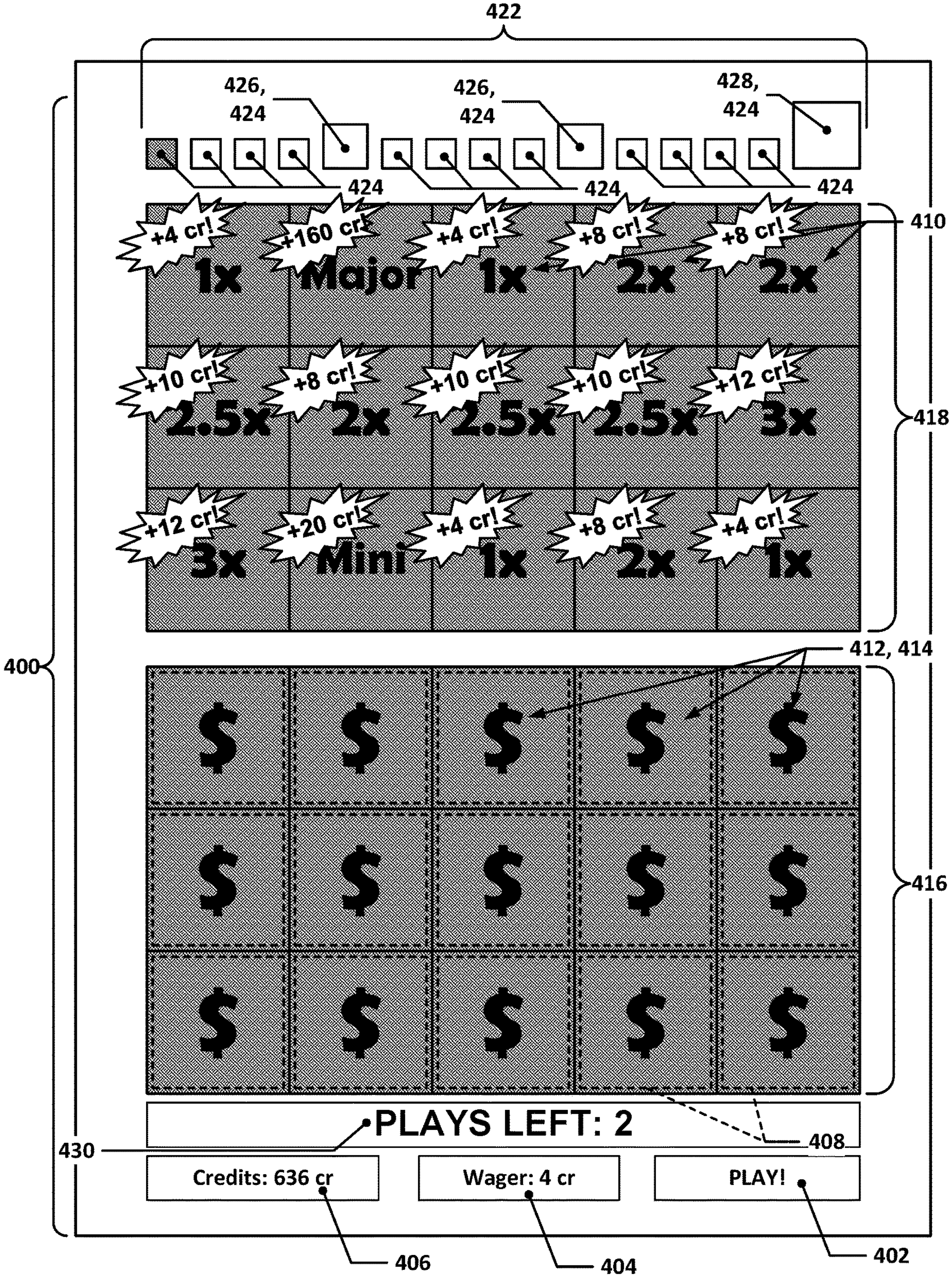

Such game play may continue, with symbols 412 that are selected for association with and display in symbol positions 408 remaining “stuck” or “held” in place and not replaced with newly selected symbols during the current round, until either the play counter 430 reaches zero, concluding the feature game mode, or until, as shown in FIG. 17, all of the symbol positions 408 are associated with symbols 412 of the first type of symbol 414. When all of the symbol positions 408 have been associated with symbols 412 of the first type of symbols 414 (which may be referred to as a "blackout"), the current round of the feature game mode may conclude. When a blackout occurs, the player may be provided with awards that are based on each of the scatter prize indicators 410. For example, in FIG. 17, the player has received a total award of 282 credits based on the individual award amounts shown (which are each determined by multiplying the wager amount of 4 credits by the multiplier associated with each scatter prize indicator 410). The play counter 430 has also been reset, as discussed above.

Figure 18:
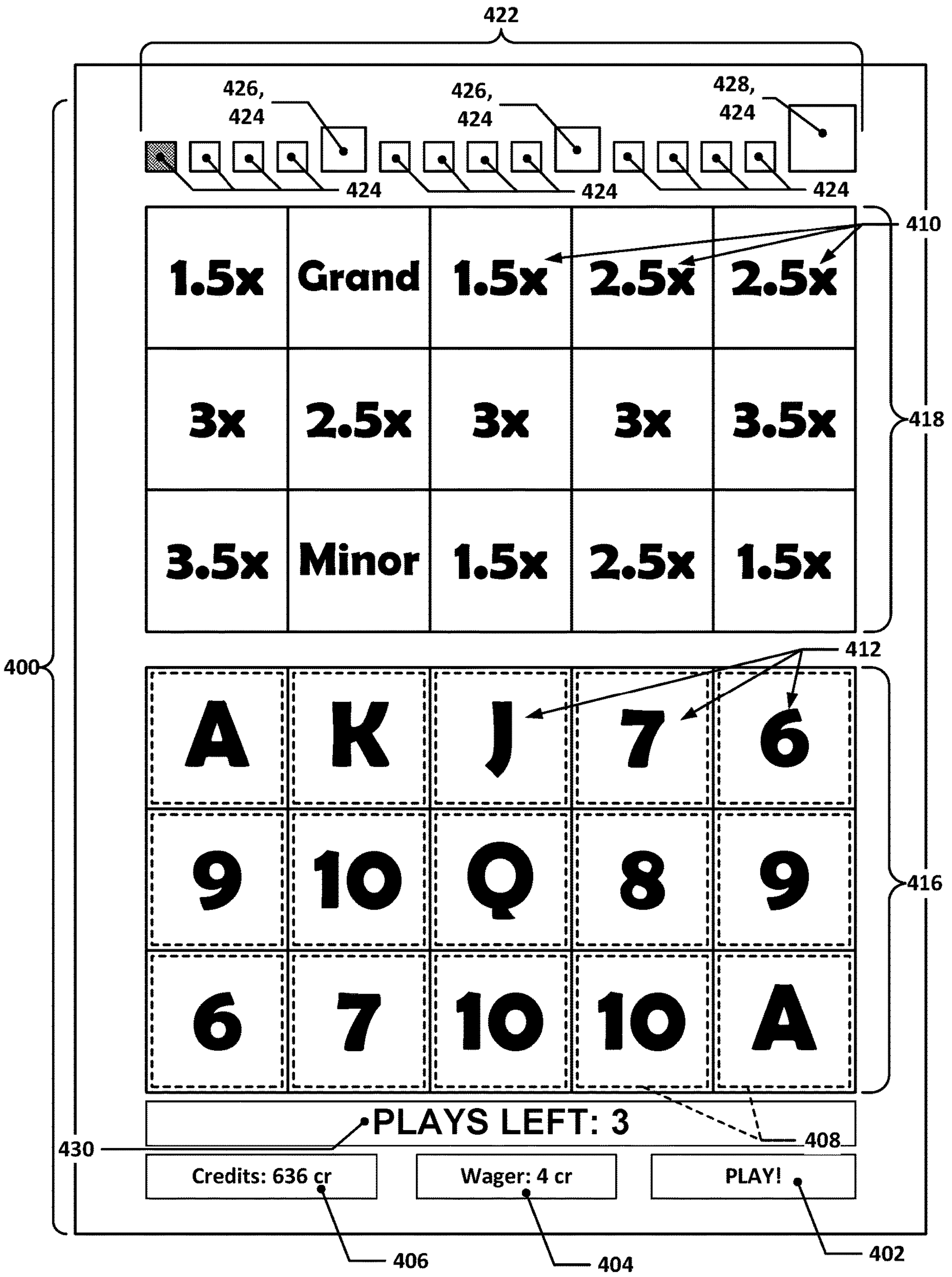

In FIG. 18, the scatter prize indicators 410 have all been upgraded (none needed to skip upgrading since none were at the maximum tier of scatter prize indicator yet), and the symbols 412 of the first type of symbol 414 have all been cleared and replaced with other symbols 412 to indicate that a new round has begun (the shading or coloring used to indicate symbol positions 408, and the scatter prize indicators 410 associated therewith, which had already been associated with a symbol 412 of the first type of symbol 414 has also been removed).

Figure 19:
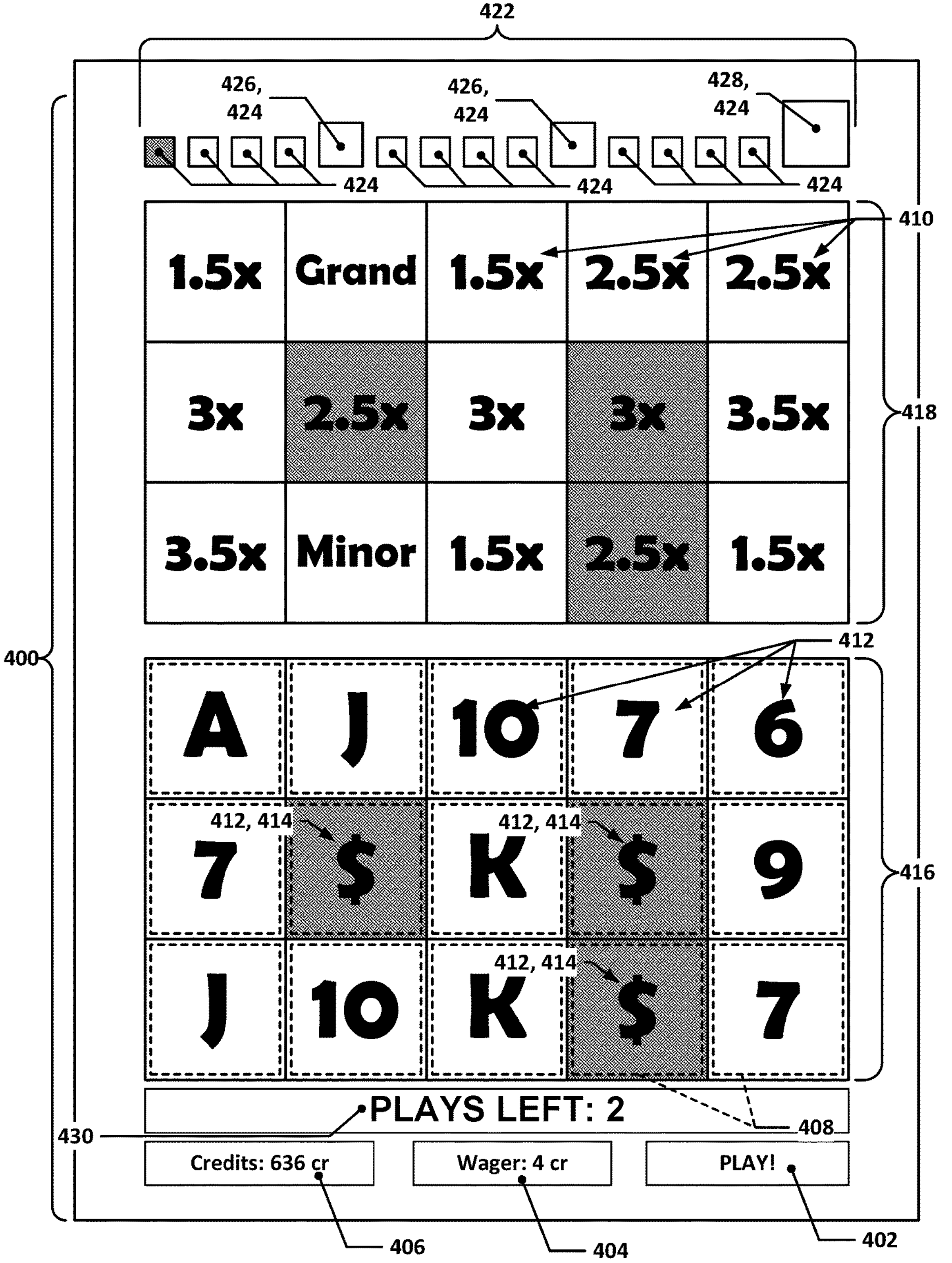

In FIG. 19, the player has engaged in several additional plays of the game of chance during the second round which have resulted in three of the symbol positions 408 becoming associated with symbols 412 of the first type of symbol 414. In the most recent play of the game, however, no new symbols 412 of the first type of symbol 414 were selected, and the play counter 430 has accordingly been decremented.

Figure 20:
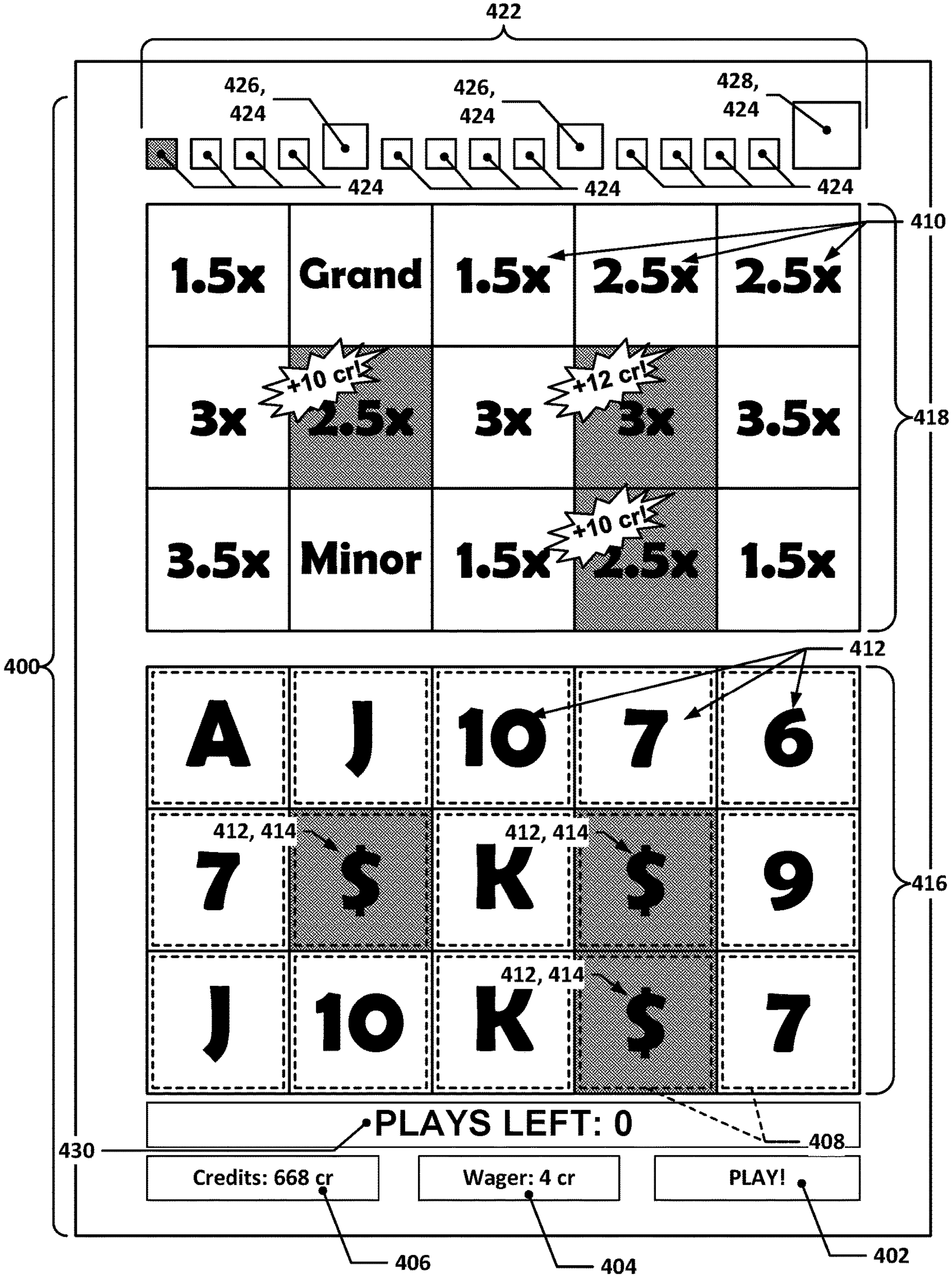

In FIG. 20, the player has engaged in two more plays of the game of chance, but neither has resulted in new symbols 412 of the first type of symbol 414 being selected. Accordingly, the play counter 430 has been decremented twice, and no plays of the feature game mode remain. Accordingly, the feature game mode is terminated, and the player is provided with awards based on the scatter prize indicators 410 associated with the symbol positions 408, if any, that are associated with the symbols 412 of the first type of symbol 414. In this example, the player is awarded 22 credits based on the wager amount of 4 credits and the application of two 2.5× and one 3× multipliers associated with the relevant scatter prize indicators 410. The GUI 400 may then return to the state that it was in prior to the feature game mode being activated.

While not shown in FIGS. 4 through 20, it will be appreciated that as a player (or players) engage in play of the game of chance over time and repeatedly trigger the feature game mode, the progress indicator 422 will reflect a larger and larger number of feature game mode activations. When a particular progress increment or increments 424 are reached in the progress indicator 422, various enhancements to the feature game mode may be provided for at least the instance of the feature game mode which is associated with that progress increment 424. Such enhancements may, for example, include associating one or more symbol positions 408 that are not already associated with symbols 412 of the first type of symbols 414 with a symbol 412 of the first type of symbol 414 (thus giving the player a head-start on a blackout) and/or upgrading one or more of the scatter prize indicators (in some cases, potentially more than one time). Thus, players are presented with multiple levels of features that may persist over different time scales—the scatter prize indicators, and their upgrades, may persist throughout non-feature game mode play and be a source of potential additional winnings prior to activation of the feature game mode, only being reset after the feature game mode has been activated. A further source of persistence is found within the feature game mode itself, in which the same set of scatter prize indicators is retained and then necessarily upgraded on a relatively continuous basis as long as the feature game mode remains active, thereby allowing each blackout event earned during feature game mode play to be more rewarding to the player than the previous blackout event during that instance of feature game mode play. Finally, a third source of persistence is found in the progress indicator and potential feature game mode enhancements that may be provided after a predetermined number or numbers of feature game mode activations have occurred—this last level of persistence spans across the intervals in which the other persistence features are active.

Figures 1, 21:
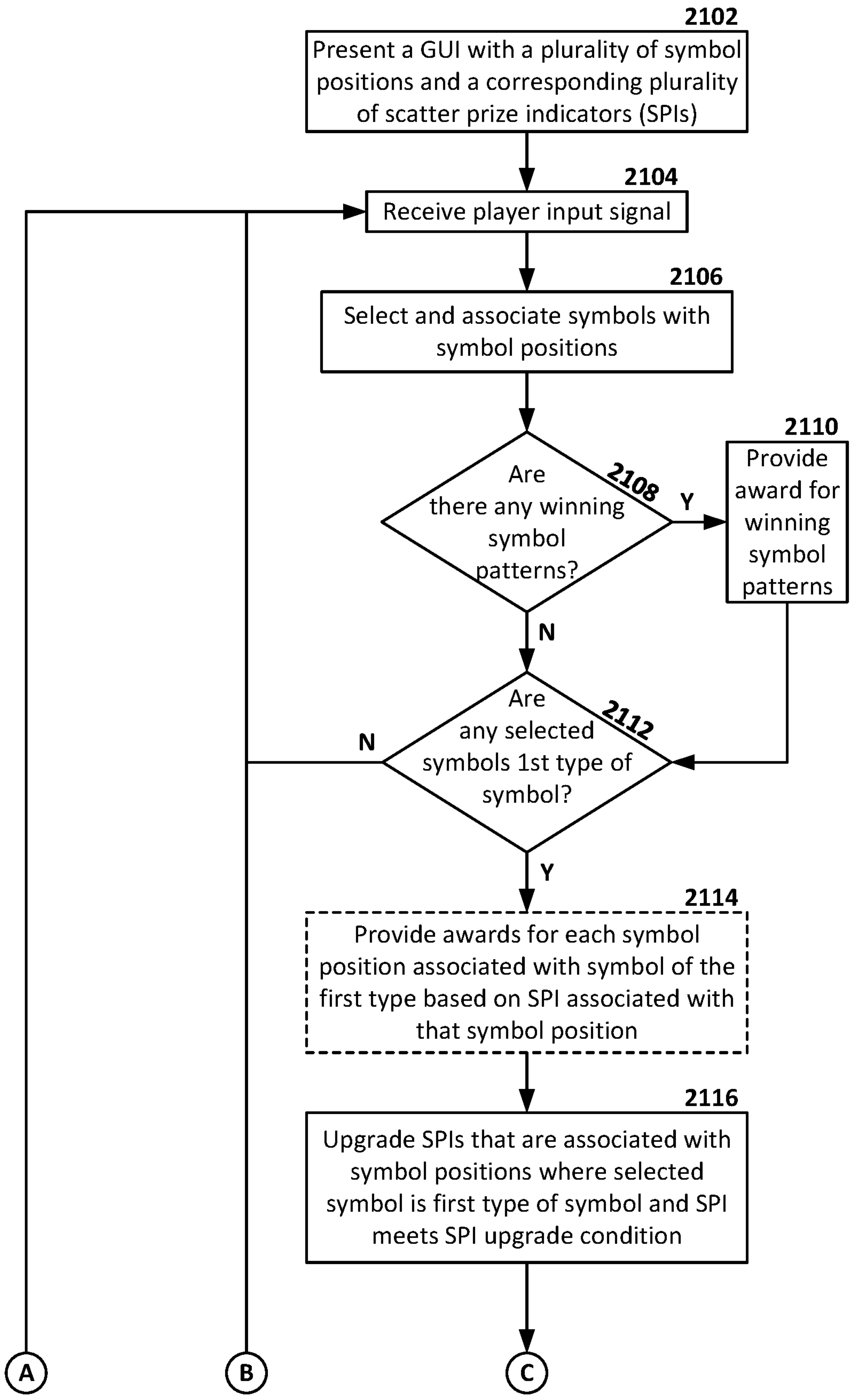
Figures 2, 21:
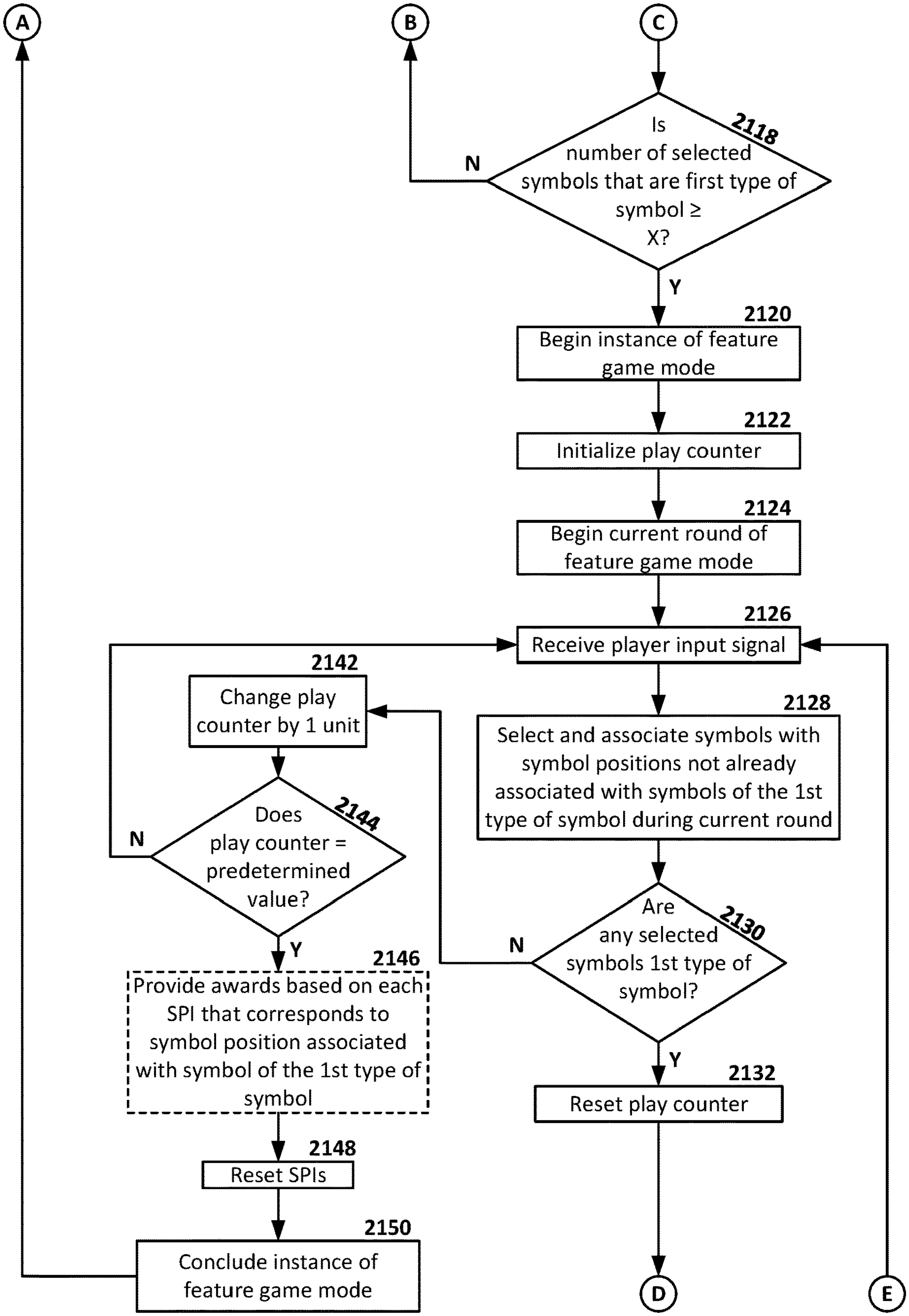
Figures 3, 21:
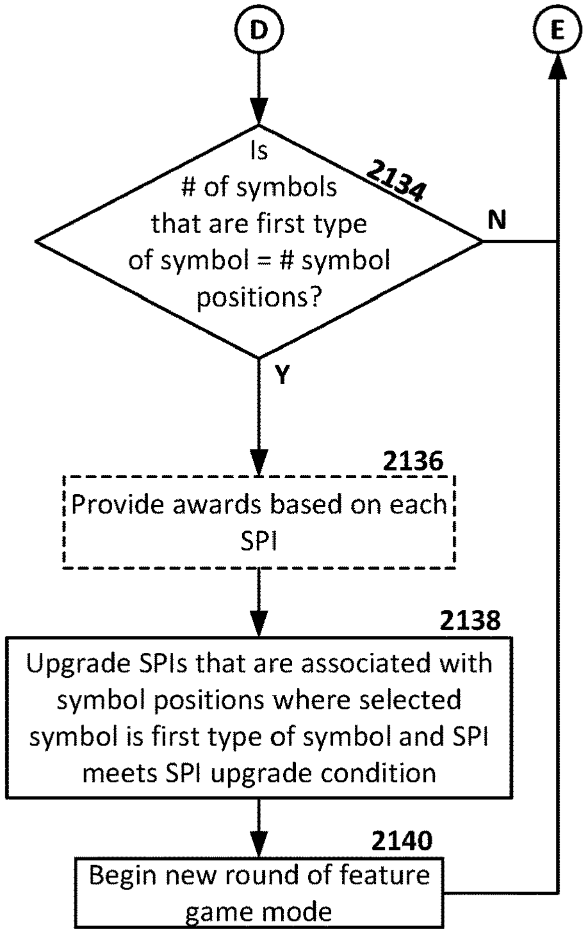

While such games of chance have been discussed above with respect to their presentation and appearance, FIGS. 21-1 through 21-3 depict a flow diagram of an example technique for providing a game of chance with a feature game mode as discussed herein that may provide additional insights as to how such games of chance may be configured to operate.

The technique may begin in block 2102, in which a GUI, e.g., such as the GUI 400 of FIG. 4 or 5, is caused to be presented. The GUI may have a plurality of symbol positions and a corresponding plurality of scatter prize indicators in it. The scatter prize indicators may be associated with the symbol positions randomly or according to a preset pattern.

In block 2104, an input indicative of a player's command to initiate a play of the game of chance may be received. For example, the input may reflect that the player has pushed or selected a "play" button on an electronic gaming machine.

In block 2106, responsive to the receipt of the input indicative of the player's command to initiate a play of the game of chance, a plurality of symbols may be selected for association with (and display in) the symbol positions. As discussed earlier, such selections may, either in whole or in part, be made according to a random number generator outcome.

In block 2108, a determination may be made as to whether or not there are any winning symbol patterns that are formed by the selected symbols when displayed in their respective symbol positions. For example, a determination may be made as to whether a sequence of symbols that lie along a common payline form a pattern that is associated with an award. Such a pattern may, for example, be a pattern that includes 3, 4, or 5 of the same symbol along a payline; other symbol patterns are, of course, possible as well. If it is determined in block 2108 that such a winning pattern exists, then the technique may proceed to block 2110, in which an award may be provided to the player for each winning pattern that is identified in the selected symbols.

After block 2110, or if it is determined in block 2108 that no such winning pattern exists, the technique may proceed to block 2112, in which a determination may be made as to whether any of the symbols selected for association with, and display in, any of the symbol positions are of a first type of symbol, e.g., a scatter symbol. If it is determined in block 2112 that no symbols of the first type of symbol have been selected in block 2106, then the technique may return to block 2104, in which another player input signal may be received and may trigger another selection of symbols.

However, if it is determined in block 2112 that one or more selected symbols are of the first type of symbol, then the technique may proceed to block 2114, in which an award amount may be provided based on the scatter prize indicator(s) that is associated with the symbol position(s)

that is associated with the symbol(s) of the first type of symbol. For example, if the scatter prize indicator(s) that is associated with the symbol position(s) that is associated with the symbol(s) of the first type of symbol is representative of a multiplier amount, then some other amount, e.g., the player's last wager amount, may be multiplied by such a multiplier amount to determine the award amount. In an alternate implementation, if the scatter prize indicator(s) that is associated with the symbol position(s) that is associated with the symbol(s) of the first type of symbol is representative of a credit amount, then that credit amount may be provided to the player. In some implementations, block 2114 may be omitted, with no award amount being provided to the player at this stage.

The technique may then proceed to block 2116, in which the scatter prize indicator(s) associated with symbol positions where the selected symbol therefor is the first type of symbol may be upgraded to be scatter prize indicators of the next higher tier of scatter symbol indicators. As noted earlier, such upgrades may be performed if the subject scatter prize indicators that are to be upgraded meet a scatter prize indicator upgrade condition. The scatter prize indicator upgrade condition may be as simple as the scatter prize indicator in question being a non-top-tier scatter prize indicator. In other implementations, the scatter prize indicator upgrade condition may feature different or additional elements, e.g., in some cases, only one scatter prize indicator may be upgraded for any given play, in which case the scatter prize indicator upgrade condition may, for example, be a condition that is met when the scatter prize indicator additionally is the (or a) highest-tier scatter prize indicator of the scatter prize indicators associated with symbol positions that are associated with symbols of the first type of symbol.

The technique may then proceed to block 2118, where a determination may be made as to whether at least a predetermined number of symbols of the first type of symbols have been selected as a result of the game play. If a determination is made that the number of symbols of the first type of symbol is less than the predetermined number of symbols, then the technique may return to block 2104, in which another player input signal may be received and may trigger another selection of symbols.

If a determination is made in block 2118 that the number of symbols of the first type of symbol is great than or equal to the predetermined number of symbols, then the technique may proceed to block 2120. The GUI may be modified to reflect that the feature game mode is active, e.g., by displaying, among other things, a play counter or other graphical indicator that conveys how many game plays are currently available before the feature game mode concludes. In some implementations, as discussed earlier, the symbols of the first type of symbol that caused the feature game mode to be triggered may be retained in their symbol positions at the start of the feature game mode.

The technique may then proceed to block 2122, in which the play counter may be initialized to a default starting value, and then to block 2124, in which a current round of the feature game mode may be started.

The technique may then proceed to block 2126, in which an input indicative of a play of the game of chance while the feature game mode is active may be received. For example, the input may reflect that the player has pushed or selected a "play" button on an electronic gaming machine.

In block 2128, responsive to the receipt of the input, one or more symbols may be selected for association with (and display in) the symbol positions that have not already been associated with a symbol of the first type of symbol in the current round (or, in the case of the first round, that did not start the first round already associated with such a symbol).

In block 2130, a determination may be made as to whether any of the symbols selected for the symbol positions that have not already been associated with a symbol of the first type of symbol are of the first type of symbol. If so, then the technique may proceed to block 2132, in which the play counter may be reset, e.g., to the default value, or to some other value that allows for more plays than the play counter indicated immediately prior to block 2132.

The technique may then proceed to block 2134, in which a determination may be made as to whether the number of symbols of the first type of symbol that are associated with the symbol positions during the current round equals the total number of symbol positions, e.g., all of the symbol positions show the first type of symbol in them. If it is determined in block 2134 that the number of symbols of the first type of symbol that are associated with the symbol positions during the current round equals the total number (or a predetermined number) of symbol positions, then the technique may proceed to block 2136, in which the player may be provided with an award based on each of the scatter prize indicators, before proceeding to block 2138.

In block 2138, the scatter prize indicator(s) may all be upgraded to be scatter prize indicators of the next higher tier of scatter symbol indicators. As noted earlier, such upgrades may be performed if the subject scatter prize indicators that are to be upgraded meet a scatter prize indicator upgrade condition.

The technique may then, in block 2140, cause a new round of the feature game mode to begin. As discussed earlier, this may involve replacing the symbols that are the first type of symbol with other symbols, effectively "clearing the board" of the first type of symbol. Thus, at the start of the new round, none of the symbol positions will generally be associated with the first type of symbol. The technique may then return to block 2126, in which another player input signal may be received and may trigger another selection of symbols.

If it is determined in block 2130 that none of the symbols selected for the symbol positions that are not already associated in the current round with a symbol of the first type of symbol are of the first type of symbol, then the technique may, instead of proceeding to block 2132, proceed to block 2142, in which the play counter may be adjusted or changed by one unit. It will be understood that in most cases, the play counter will be an integer value that is decreased by one unit until it reaches zero or is reset, but in other cases, the play counter may be configured differently, e.g., counting up to three from zero or in some other way tracking the number of plays left.

The technique may then proceed to block 2144, in which a determination may be made as to whether the play counter equals a predetermined value, e.g., zero (if the play counter counts down) or the number of plays (if the play counter counts up from zero). If the play counter is determined to not be equal to the predetermined value, then the technique may proceed to block 2126, in which another player input signal may be received and may trigger another selection of symbols. If it is determined in block 2144 that the play counter is equal to the predetermined value, then the technique may proceed to block 2146, in which awards may be provided to the player based on each scatter prize indicator that is associated with a symbol position that is currently associated with a symbol of the first type of symbol.

The technique may then proceed to block 2148, in which the scatter prize indicators may be reset, e.g., randomly re-selected or reset according to a predefined pattern, and then to block 2150, in which the instance of the feature game mode may be concluded. The technique may then return to block 2104, in which another player input signal that triggers another selection of symbols may be received while the feature game mode is inactive.

It will be appreciated that the various awards discussed above may, in some implementations, be omitted in some stages. For example, the awards provided in association with the upgrade of a scatter prize indicator while the feature game mode is not active may, in some instances, be omitted (the scatter prize indicator may still upgrade, however). In another example, if the symbols of the first type of symbol that are selected for a given play of the game of chance while the feature mode is not active are sufficient to trigger the feature game mode, then an award based on the scatter prize indicators associated with the symbol positions for those symbols may not be provided (although it may have been provided had the number of such symbols been insufficient to trigger the feature game mode).

It will also be appreciated that the techniques discussed above, and the game of chance discussed herein, may be implemented in both social gaming and cash gaming contexts. For example, in social gaming contexts, the credits that are used may be a social gaming currency, e.g., not redeemable for actual monetary amounts, but in cash gaming contexts, the credits may be redeemable for a corresponding amount of actual currency. Such games of chance may be implemented in traditional electronic gaming machines, e.g., slot machines that are installed on the floor of a casino, or on other platforms, such as on mobile phones or tablets (particularly in the context of remote game server (RGS) social and real-money gaming implementations).

Figure 22:
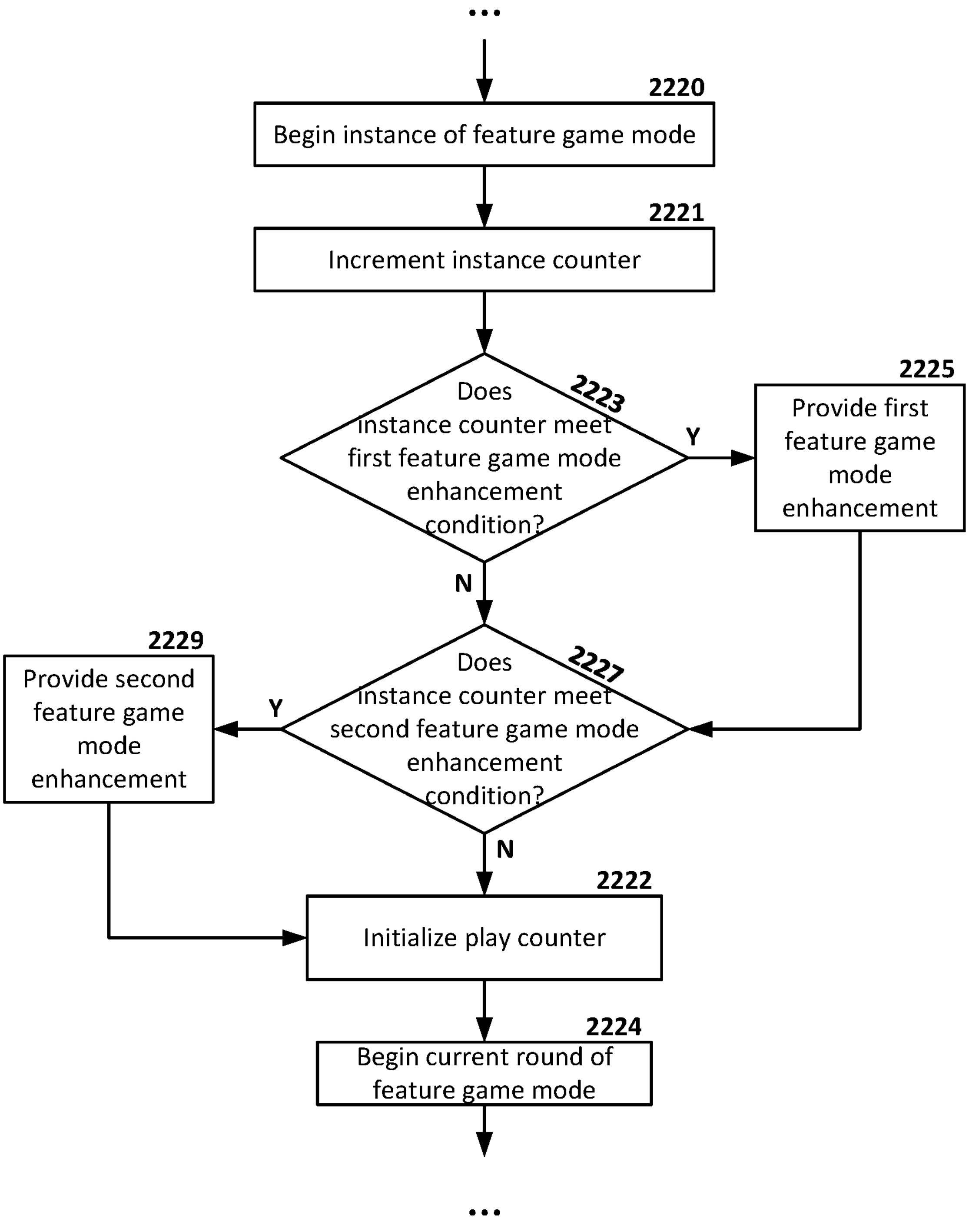
FIG. 22 depicts a flow diagram of an example technique for providing a persistent feature game enhancement mechanism for games of chance as discussed herein.

As discussed earlier, the games of chance discussed herein may also incorporate a long-term persistence feature that may cause various feature game enhancements to be provided at various points in time. FIG. 22 depicts a flow diagram of an example technique for providing such a persistent feature game enhancement mechanism for games of chance as discussed herein.

In block 2220, an instance of the feature game mode may be initiated (e.g., as discussed with respect to block 2120 of FIG. 21). In block 2221, an instance counter that tracks the number of instances of the feature game mode that have been initiated since a particular point in time, e.g., since the instance counter was initialized or re-initialized, may be incremented to reflect the initialization of the feature game mode in block 2220. In block 2223, a determination may be made as to whether the instance counter has a value that meets a first feature game mode enhancement condition. If it is determined in block 2223 that the instance counter value meets the first feature game mode enhancement condition, then the technique may proceed to block 2225, in which the first feature game mode enhancement may be provided. If it is determined in block 2223 that the instance counter does not meet the first feature game mode enhancement condition, then the technique may proceed to block 2227, in which a determination may be made as to whether the instance counter has a value that meets a second feature game mode enhancement condition. If it is determined in block 2227 that the instance counter value meets the second feature game mode enhancement condition, then the technique may proceed to block 2229, in which the second feature game mode enhancement may be provided. If it is determined in block 2227 that the instance counter does not meet the second feature game mode enhancement condition, then the technique may proceed to block 2222, in which the play counter for the feature game mode may be initialized, and then block 2224, in which a first round of the feature game mode may be initiated (similar to blocks 2122 and 2124 of FIG. 21).

It will be understood that in some implementations, only a first feature game mode enhancement condition may be evaluated. In other implementations, more than two feature game enhancement conditions may be evaluated.

The first feature game mode enhancement condition may, for example, be met when the value of the instance counter is equal to one or more first values, e.g., 5, 10, or 5 or 10, etc. The second feature game mode enhancement condition may, similarly, be met when the value of the instance counter is equal to one or more second values, e.g., 10, 15, 20, 25, etc.

The first and second feature game mode enhancements may take a variety of forms. For example, such feature game mode enhancements may, in some cases, be provided by causing a number (either randomly determined or predetermined) of scatter prize indicators to be upgraded at the start of the feature game mode. In some such implementations, each such upgrade may only be applied to a given scatter prize indicator once in association with providing the feature game mode enhancement. In other such implementations, however, multiple such upgrades may be applied to a given scatter prize indicator, thus upgrading the scatter prize indicator multiple times, in association with providing the feature game mode enhancement.

Another potential feature game mode enhancement may be provided by causing one or more symbol locations not already associated with a symbol of the first type of symbol at the start of the feature game mode to be associated with such a symbol at the start of the feature game mode, thus giving the player a head start on having all of the symbol positions associated with symbols of the first type of symbol.

In some cases, both types of feature game mode enhancements may be provided in combination as a single feature game mode enhancement. For example, the first feature game mode enhancement may be provided by either upgrading one or more scatter prize indicators or by associating one or more symbol locations not already associated with a symbol of the first type of symbol at the start of the feature game mode with such a symbol at the start of the feature game mode, and the second feature game mode enhancement may be provided by upgrading one or more scatter prize indicators and by associating one or more symbol locations not already associated with a symbol of the first type of symbol at the start of the feature game mode with such a symbol at the start of the feature game mode.

In some implementations with such a long-term persistence feature, when the instance counter value reaches a particular value, the instance counter may be reset or reinitialized.

As discussed above, games of chance such as those discussed herein have the potential to, in theory, allow players to engage in feature game mode play for extended periods of time—as long as the player keeps having additional symbols of the first type of symbol selected frequently enough in plays of the game of chance during the feature game mode, the play counter may continue to be reset, the scatter prize indicators may continue to be upgraded (until eventually all are at the maximum tier of scatter prize indicator), and the player may simply continue to achieve "blackouts" and earn awards. While this can be prevented by reducing the number of symbols of the first type of symbol that are present in each set of symbols from which symbols are selected for each "reel" of symbol positions, such an approach may lead to the opposite effect—symbols of the first type of symbols may become harder and harder to obtain as the symbol positions all become associated with symbols of the first type during feature game mode play. For example, if there are three symbol positions associated with each "reel," and the symbol set for that reel has only a three percent chance of having a symbol of the first type of symbol selected on any given play of the game of chance, that chance will reduce to two percent once one of the symbol positions becomes associated with a symbol of the first type of symbol, and to one percent once two of the symbol positions become associated with symbols of the first type of symbol.

Figure 23:
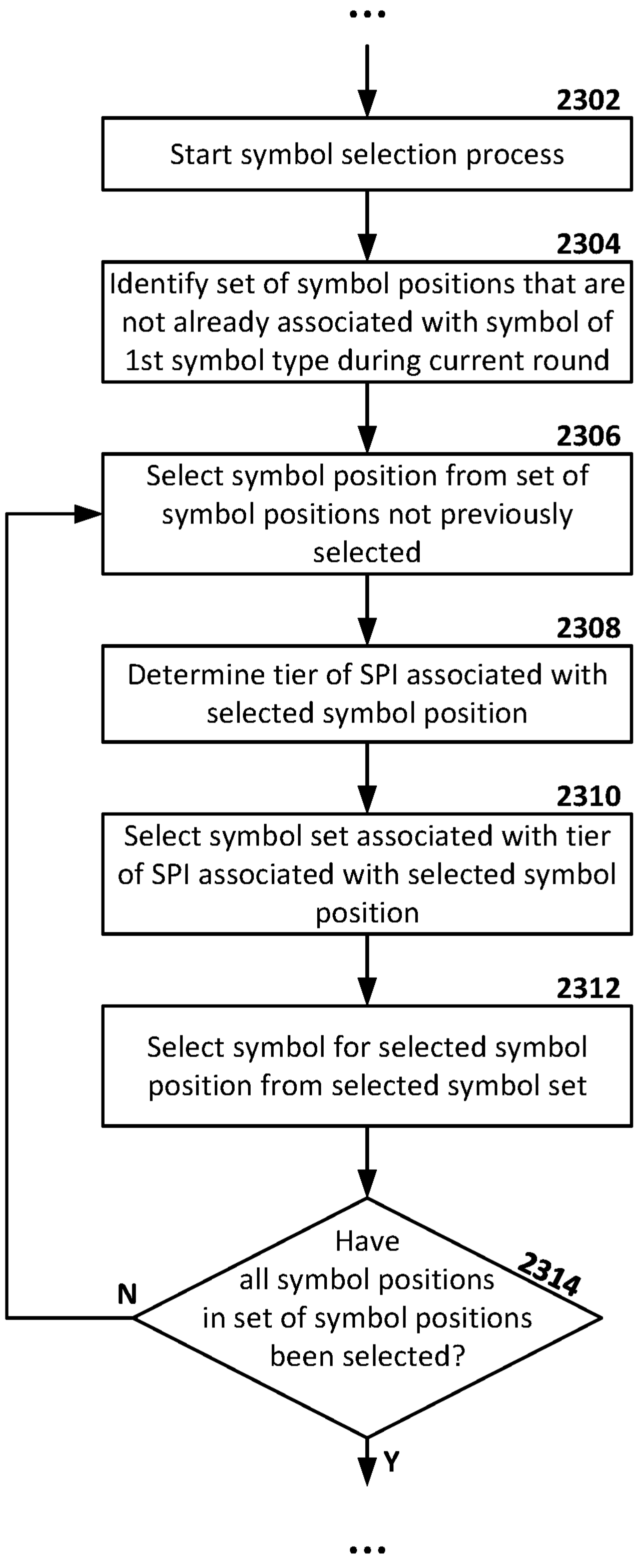
FIG. 23 depicts a flow diagram of an example technique for selecting symbols for display in association with symbol positions while a feature game mode as discussed herein is active.

In order to provide greater control over the frequency with which symbols of the first type of symbol may be newly selected and associated with symbol positions during the feature game mode, some implementations of the game of chance may include a modified symbol selection technique that allows for greater control over such selection frequency. Such a technique is discussed below with respect to FIG. 23, which depicts a flow diagram of an example technique for selecting symbols for display in association with symbol positions while a feature game mode as discussed herein is active. Such a technique may, for example, be used in performing block 2128 of FIG. 21.

In block 2302, a symbol selection process, e.g., for selecting symbols while the feature game mode is active, may be initiated, e.g., responsive to an input signal that is received to indicate a start of a play of the game of chance while the feature game mode is active.

In block 2304, a set of symbol positions may be identified; each symbol position in the set of symbol positions is a symbol position that is not already associated with a symbol of the first type of symbol during the current round, i.e., each of the symbol positions in the set of symbol positions is a symbol position that still needs to have a symbol of the first type of symbol selected therefor and associated therewith during the current round of the feature game mode in order to achieve a "blackout" condition.

In block 2306, a symbol position from the set of symbol positions not previously selected during the current symbol selection process may be selected. In block 2308, the tier of the scatter prize indicator associated with the selected symbol position may be determined. In block 2310, a selection may be made of a symbol set (also referred to herein as a "reel set") that is at least associated with the tier of the scatter prize indicator associated with the selected symbol position. As noted earlier, in some implementations, there may be a plurality of symbol sets associated with one or more of the tiers of scatter prize indicators. In such implementations, other factors, e.g., how many symbol positions are yet to be associated with symbols of the first type of symbols in the current round, how many rounds have elapsed since the start of the feature game mode instance, etc., may additionally be used to guide selection of a particular symbol set that is associated with a given tier of scatter prize indicators.

Since each tier of scatter prize indicators is associated with its own symbol set (or sets), it is possible to design each symbol set so as to have a different probability that a symbol of the first type is randomly selected. For example, some symbol sets may have a greater or lower percentage of the symbols in the symbol set be of the first type of symbol than other symbol sets and may thus have a higher or lower probability of having a symbol of the first type of symbol be randomly selected (or alternatively, the symbol sets may have one of each symbol and different weightings that influence how frequently each symbol is randomly selected by a random number generator). This allows the probability of a symbol of the first type of symbol being selected to be tuned for each symbol position based on what tier the scatter prize indicator associated with that symbol position is. This, with the optional additional probabilistic tuning that may be provided by having additional symbol sets for one or more tiers that may be selected between based on other factors such as number of symbol positions not yet associated with symbols of the first type of symbol during the current round, the number of elapsed rounds in the current instance of the feature game mode, and so forth, allows for very granular control of the feature game mode gameplay experience. This allows, for example, symbol sets with a higher chance of having a symbol of the first type of symbol selected to be used for lower-tier scatter prize indicators, while symbol sets with a lower chance of having a symbol of the first type of symbol selected may be used for higher-tier scatter prize indicator. This provides players with a higher chance of having symbols of the first type of symbol be selected for symbol positions associated with lower-tier scatter prize indicators than for symbol positions associated with higher-tier scatter prize indicators. As the symbol positions get upgraded after each round of feature game mode game play concludes, the chances of the player being able to continue having symbols of the first type of symbol be selected frequently enough to keep resetting the play counter and keep the feature game mode active may get lower and lower. Thus, the player will generally have a very good chance of obtaining "blackouts" when the scatter prize indicators are, on average, from lower tiers, but will face steadily higher odds of obtaining "blackouts" as the scatter prize indicators, on average, increase in tier.

Returning to FIG. 23, in block 2312, a selection of a symbol may be made from the symbol set selected for that symbol position; such a selection may, as noted above, be made randomly. The selected symbol may then be associated with that symbol position; if the selected symbol is the first type of symbol, then the selected symbol for that symbol position may stay associated with that symbol position for the remainder of that round of the feature game mode.

In block 2314, a determination may be made as to whether all of the symbol positions in the set of symbol positions have had symbols selected therefor in the current symbol selection process. If not, then the technique may return to block 2306, in which another symbol position in the set of symbol positions may be selected and blocks 2308-2312 repeated for that newly selected symbol position. If so, then the technique may proceed onward, e.g., to block 2130 of FIG. 21.

While various implementations have been discussed above, other implementations will be apparent from the above discussion and are considered within the scope of this disclosure. For example, the above discussions have referred to symbols of the first type of symbol, but only scatter prize symbols have been mentioned. In other implementations, different sub-types of scatter prize symbols may be used, any of which may be treated as the first type of symbol. For example, the first type of symbol may be a cash-on-reel (COR) symbol indicative of a credit amount (either real currency or non-fungible/social credits)—each COR symbol that is displayed may be selected from multiple different COR symbols representing different credit amounts. In some such implementations, an award may be provided when a COR symbol is displayed that is based on the value of the COR symbol multiplied by, for example, the corresponding scatter prize indicator for the symbol position in which the COR symbol is displayed. Thus, for example, if a 20-credit COR symbol is displayed in the lower left corner of the symbol positions and the scatter prize indicator associated with that symbol position is a 2.5× multiplier, then the player may be awarded 50 credits.

It is to be understood that the phrases "for each <item> of the one or more <items>," "each <item> of the one or more <items>," or the like, if used herein, are inclusive of both a single-item group and multiple-item groups, i.e., the phrase "for . . . each" is used in the sense that it is used in programming languages to refer to each item of whatever population of items is referenced. For example, if the population of items referenced is a single item, then "each" would refer to only that single item (despite the fact that dictionary definitions of "each" frequently define the term to refer to "every one of two or more things") and would not imply that there must be at least two of those items. Similarly, the term "set" or "subset" should not be viewed, in itself, as necessarily encompassing a plurality of items—it will be understood that a set or a subset can encompass only one member or multiple members (unless the context indicates otherwise).

The term "between," as used herein and when used with a range of values, is to be understood, unless otherwise indicated, as being inclusive of the start and end values of that range. For example, between 1 and 5 is to be understood to be inclusive of the numbers 1, 2, 3, 4, and 5, not just the numbers 2, 3, and 4.

The use, if any, of ordinal indicators, e.g., (a), (b), (c) . . . or the like, in this disclosure and claims is to be understood as not conveying any particular order or sequence, except to the extent that such an order or sequence is explicitly indicated. For example, if there are three steps labeled (i), (ii), and (iii), it is to be understood that these steps may be performed in any order (or even concurrently, if not otherwise contraindicated) unless indicated otherwise. For example, if step (ii) involves the handling of an element that is created in step (i), then step (ii) may be viewed as happening at some point after step (i). Similarly, if step (i) involves the handling of an element that is created in step (ii), the reverse is to be understood. It is also to be understood that use of the ordinal indicator "first" herein, e.g., "a first item," should not be read as suggesting, implicitly or inherently, that there is necessarily a "second" instance, e.g., "a second item."

While the disclosure has been described with respect to the figures, it will be appreciated that many modifications and changes may be made by those skilled in the art without departing from the spirit of the disclosure. Any variation and derivation from the above description and figures are included in the scope of the present disclosure as defined by the claims.

What is claimed is:

1. An electronic gaming system comprising:

one or more displays; and a game controller that includes one or more processors and one or more memory devices, wherein:

the one or more processors, the one or more memory devices, and the one or more displays are operably connected, and the one or more memory devices store computer-executable instructions which, when executed by the one or more processors, cause the one or more processors to:

a) cause a graphical user interface (GUI) for a first game of chance to be rendered via the one or more displays, wherein the GUI for the first game of chance includes a plurality of symbol positions and has an activatable feature game mode;

b) cause a plurality of scatter prize indicators to be displayed by the one or more displays via the GUI for the first game of chance, each scatter prize indicator associated with a different one of the symbol positions and selected from a plurality of tiers of scatter prize indicators;

c) cause, responsive to each receipt of a player input signal indicating a play of the first game of chance while the feature game mode is not activated:

d) a plurality of symbols to be selected and displayed in a different one of the symbol positions in the GUI for the first game of chance;

e) the GUI to display the scatter prize indicator or indicators that is or are associated with any of the symbol positions that is or are associated with a selected symbol or selected symbols that is or are a first type of symbol and that meets or meet a scatter prize indicator upgrade condition being upgraded to the next higher tier of scatter prize indicators; and f) the GUI to initiate an instance of the feature game mode responsive to the GUI displaying at least a threshold number of symbols that are the first type of symbol responsive to the receipt of the player input signal indicating the play of the first game of chance wherein the one or more memory devices further store additional computer-executable instructions which, when executed by the one or more processors, further cause the one or more processors to, responsive to each receipt of the player input signal indicating a play of the first game of chance while the instance of the feature game mode is ongoing, cause:

g) a symbol to be selected and displayed in each symbol position of the GUI that is in a first set of the symbol positions that at least excludes symbol positions that previously displayed a symbol of the first type of symbol during a current round of that instance of the feature game mode, h) a play counter displayed in the GUI for that instance of the feature game mode to be reset to a default number of units when at least one symbol selected and displayed in one of the symbol positions of the GUI in (g) is the first type of symbol and to be changed by one unit when no symbol selected and displayed in the symbol position or symbol positions of the GUI in (g) is the first type of symbol, and i) the GUI to indicate that that instance of the feature game mode has concluded when the play counter reaches a predetermined value.

2. The electronic gaming system of claim 1, wherein the symbol positions in the GUI are arranged in a first pattern and the scatter prize indicators in the GUI are arranged in a pattern that matches the first pattern but is located in a different location from the first pattern.

3. The electronic gaming system of claim 1, wherein the scatter prize indicators in the plurality of scatter prize indicators caused to be presented via the GUI in the one or more displays in (b) are randomly selected.

4. The electronic gaming system of claim 1, wherein:

each tier of scatter prize indicators has a corresponding weight, and each scatter prize indicator is randomly selected from the tiers of scatter prize indicators according to the weights corresponding to the tiers.

5. The electronic gaming system of claim 1, wherein each tier of scatter prize indicators corresponds with a different multiplier amount.

6. The electronic gaming system of claim 5, wherein a subset of the tiers of scatter prize indicators includes one or more scatter prize indicators that each correspond with a different multiplier amount and a progressive award.

7. The electronic gaming system of claim 1, wherein each tier of scatter prize indicators corresponds with a different credit amount.

8. The electronic gaming system of claim 1, wherein the one or more memory devices further store additional computer-executable instructions for controlling the one or more processors to, responsive to each performance of (d), cause, for each symbol position in the GUI that displays a selected symbol of the first type of symbol as a result of (d), a credit meter displayed in the GUI to be updated with a corresponding award that is based on the scatter prize indicator associated with that symbol position.

9. The electronic gaming system of claim 1, wherein the first set of the symbol positions also at least excludes the symbol position or symbol positions that displayed a symbol or symbols of the first type of symbol when that instance of the feature game mode was initiated.

10. The electronic gaming system of claim 1, wherein the one or more memory devices further store additional computer-executable instructions for controlling the one or more processors to cause, responsive to each iteration of (g) through (h) in which all of the symbol positions are associated with selected symbols of the first type of symbol after (g):

the scatter prize indicator or indicators that are associated with all of the symbol positions that meet the scatter prize indicator upgrade condition to be upgraded to the next higher tier of scatter prize indicator, the current round of that instance of the feature game mode to be concluded and a new round of that instance of the feature game mode to be started.

11. The electronic gaming system of claim 10, wherein the one or more memory devices further store additional computer-executable instructions for controlling the one or more processors to, responsive to each conclusion of a current round of an instance of the feature game mode due to all of the symbol positions being associated with selected symbols of the first type of symbols, cause a credit meter displayed in the GUI to update to reflect an award in association with the conclusion of that current round of that instance of the feature game mode, wherein the award is based on the scatter prize indicators that are associated with all of the symbol positions at the conclusion of that current round of that instance of the feature game mode.

12. The electronic gaming system of claim 1, wherein the one or more memory devices further store additional computer-executable instructions for controlling the one or more processors to cause a credit meter displayed in the GUI to update to reflect an award as part of (i), wherein the award is based on the scatter prize indicators that are associated with the symbol positions in the GUI that display symbols of the first type of symbol at the conclusion of that instance of the feature game mode.

13. The electronic gaming system of claim 1, wherein the one or more memory devices further store additional computer-executable instructions for controlling the one or more processors to, in association with each initiation of an instance of the feature game mode:

determine whether a number of instances of the feature game mode that have been initiated since a predetermined point in time meets a first feature game mode enhancement condition; and cause, responsive to each determination that the first feature game mode enhancement condition has been met, at least one of i) the GUI to be updated to upgrade one or more of the scatter prize indicators to the next higher tier of scatter prize indicator, ii) the GUI to display a symbol of the first type or symbols of the first type of symbol in one or more symbol positions of the GUI that do not display a symbol of the first type of symbol at the start of that instance of the feature game mode, or iii) both i) and ii).

14. The electronic gaming system of claim 13, wherein the one or more memory devices further store additional computer-executable instructions for controlling the one or more processors to, in association with each initiation of an instance of the feature game mode:

determine whether a number of instances of the feature game mode that have been initiated since a predetermined point in time meets a second feature game mode enhancement condition different from the first feature game mode enhancement condition; and cause, responsive to each determination that the second feature game mode enhancement condition has been met, at least one of i) the GUI to be updated to upgrade one or more of the scatter prize indicators to the next higher tier of scatter prize indicator, ii) the GUI to display a symbol of the first type or symbols of the first type in one or more symbol positions of the GUI that did not display a symbol of the first type of symbol at the start of that instance of the feature game mode, or iii) both i) and ii).

15. The electronic gaming system of claim 14, wherein the one or more memory devices further store additional computer-executable instructions for controlling the one or more processors to cause, responsive to each determination that the second feature game mode enhancement condition has been met, the GUI to be updated to upgrade at least a first number of the scatter prize indicators to the next higher tier of scatter prize indicator, wherein the first number is greater than a number of scatter prize indicators, if any, that the GUI is caused upgraded responsive to the first feature game mode enhancement condition being met.

16. The electronic gaming system of claim 14, wherein the one or more memory devices further store additional computer-executable instructions for controlling the one or more processors to cause, responsive to each determination that the second feature game mode enhancement condition has been met, the GUI to be updated to display a symbol of the first type of symbol in at least a first number of symbol positions that did not display symbols of the first type of symbol at the start of the current instance of the feature game mode, wherein the first number is greater than a number of symbol positions, if any, that are to be caused to display symbols of the first type of symbol responsive to the first feature game mode enhancement condition being met.

17. The electronic gaming system of claim 1, wherein the one or more memory devices further store additional computer-executable instructions for controlling the one or more processors to, in performing (g), select and display the symbol for each symbol position in the first set independently of the selection and display of the symbol for any other symbol position in the first set.

18. The electronic gaming system of claim 1, wherein:

each tier of scatter prize indicators is associated with one or more corresponding first reel sets of symbols, and the one or more memory devices further store additional computer-executable instructions for controlling the one or more processors to, in performing (g):

select, for each symbol position in the first set, one of the one or more corresponding first reel sets of symbols associated with the tier of the scatter prize indicator associated with that symbol position, and select and display the symbol for each symbol position in the first set by randomly selecting a symbol from the first reel set selected for that symbol position.

19. The electronic gaming system of claim 18, wherein:

the symbol positions are partitioned into multiple subsets, each subset of symbol positions is associated with one or more corresponding second reel sets of symbols, and the one or more memory devices further store additional computer-executable instructions for controlling the one or more processors to, in performing (d):

select, for each subset of symbol positions, one of the one or more corresponding second reel sets of symbols, and select and display the symbol for each symbol position in each subset of symbol positions from the second reel set of symbols selected for that subset of symbol positions.

* * * * *